US011714181B2

(12) United States Patent
Long et al.

(10) Patent No.: US 11,714,181 B2
(45) Date of Patent: *Aug. 1, 2023

(54) SYSTEMS AND METHODS TO DETECT MOTION ON SLOPED SURFACES

(71) Applicant: Niiva OpCo, LLC, Provo, UT (US)

(72) Inventors: David Long, Provo, UT (US); Jordan Hill, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,498

(22) Filed: Jul. 27, 2022

(65) Prior Publication Data

US 2022/0373668 A1 Nov. 24, 2022

Related U.S. Application Data

(63) Continuation of application No. 16/735,365, filed on Jan. 6, 2020, now Pat. No. 11,402,483.

(Continued)

(51) Int. Cl.
*G01S 13/534* (2006.01)
*G08B 21/10* (2006.01)
(Continued)

(52) U.S. Cl.
CPC ............ *G01S 13/534* (2013.01); *G01S 13/42* (2013.01); *G01S 13/87* (2013.01); *G08B 21/10* (2013.01); *H04B 7/0617* (2013.01)

(58) Field of Classification Search
CPC ........ G01S 13/534; G01S 13/42; G01S 13/87; G08B 21/10; H04B 7/0617
(Continued)

(56) References Cited

U.S. PATENT DOCUMENTS 4,300,121 A * 11/1981 Fritzsche ................ G01S 13/88
340/928
4,435,709 A * 3/1984 Kipp ........................ G01S 13/32
342/124

(Continued)

FOREIGN PATENT DOCUMENTS

WO 2008125929 A2 10/2008
WO WO-2008125929 A2 * 10/2008 ......... G01S 13/9023

OTHER PUBLICATIONS

Chen, Hsieh-Chung, et al., Determining RF Angle of Arrival using COTS Antenna Arrays: A Field Evaluation, School of Engineering and Applied Sciences, Harvard University, 2012, 6 pp.

(Continued)

*Primary Examiner* — Nuzhat Pervin
(74) *Attorney, Agent, or Firm* — PCFB, LLC; Justin K. Flanagan

(57) ABSTRACT

Systems and methods are described to identify motion events on a sloped surface, such as a mountainside, using transmitted and received radio frequency (RF) chirps. A one-dimensional array of receive antennas can be digitally beamformed to determine azimuth information of received reflected chirps. Elevation information can be determined based on time-of-flight measurements of received reflected chirps and known distances to locations on the sloped surface. Motion events may be characterized by deviations in return power levels and/or return phase shifts. The systems and methods may, for example, be used to provide real-time detection of avalanches and/or landslides.

18 Claims, 18 Drawing Sheets

Related U.S. Application Data

(60) Provisional application No. 62/789,191, filed on Jan. 7, 2019.

(51) Int. Cl.
    *G01S 13/87* (2006.01)
    *G01S 13/42* (2006.01)
    *H04B 7/06* (2006.01)

(58) Field of Classification Search
    USPC .......................................................... 342/61
    See application file for complete search history.

(56) References Cited

U.S. PATENT DOCUMENTS

| | | | | |
|---|---|---|---|---|
| 4,527,161 A * | 7/1985 | Wehner | ................ | G01S 13/24 342/152 |
| 4,649,390 A * | 3/1987 | Andrews | ................ | G01S 13/87 342/158 |
| 4,961,075 A * | 10/1990 | Ward | ................ | G01S 13/42 342/148 |
| 5,245,347 A * | 9/1993 | Bonta | ................ | G01S 7/36 342/149 |
| 5,831,570 A * | 11/1998 | Ammar | ................ | F41G 7/2246 342/149 |
| 6,311,108 B1 * | 10/2001 | Ammar | ................ | G01S 13/913 701/16 |
| 6,362,775 B1 * | 3/2002 | Goebel | ................ | G01S 13/87 342/63 |
| 6,430,480 B1 * | 8/2002 | Ammar | ................ | G01S 13/953 701/16 |
| 6,591,171 B1 * | 7/2003 | Ammar | ................ | F41G 7/2246 701/16 |
| 7,002,510 B1 * | 2/2006 | Choate | ................ | G01S 11/04 342/146 |
| 7,196,653 B2 * | 3/2007 | Hall | ................ | G01S 13/9056 342/75 |
| 7,277,042 B1 * | 10/2007 | Cho | ................ | G01S 7/00 342/25 R |
| 8,686,892 B2 * | 4/2014 | McCleary | ................ | G01S 13/9027 342/25 R |
| 9,229,102 B1 * | 1/2016 | Wright | ................ | G01S 13/885 |
| 9,518,830 B1 * | 12/2016 | Breed | ................ | G08G 1/0962 |
| 9,529,082 B1 * | 12/2016 | Rikoski | ................ | G01S 7/52004 |
| 9,857,453 B1 * | 1/2018 | DeSimone, Jr. | ................ | G01S 13/582 |
| 10,139,492 B2 * | 11/2018 | Rezk | ................ | G01S 17/42 |
| 2004/0040764 A1 * | 3/2004 | Polak | ................ | H01Q 1/3233 180/169 |
| 2004/0046690 A1 * | 3/2004 | Reeves | ................ | G01S 13/89 342/175 |
| 2004/0233098 A1 * | 11/2004 | Millikin | ................ | G01S 7/295 342/107 |
| 2005/0104763 A1 * | 5/2005 | Hall | ................ | G01S 13/9056 342/25 A |
| 2007/0063889 A1 * | 3/2007 | Hulbert | ................ | G01S 3/74 342/134 |
| 2007/0126620 A1 * | 6/2007 | Channabasappa | ..... | H01Q 1/521 342/198 |
| 2009/0184865 A1 * | 7/2009 | Valo | ................ | G06V 10/752 342/25 F |
| 2009/0232349 A1 * | 9/2009 | Moses | ................ | G06T 5/006 382/100 |
| 2009/0278732 A1 * | 11/2009 | Antonik | ................ | G01S 13/9054 342/25 B |
| 2010/0019950 A1 * | 1/2010 | Yamano | ................ | G01S 7/352 342/104 |
| 2010/0045513 A1 * | 2/2010 | Pett | ................ | G01S 13/867 342/25 C |
| 2011/0074621 A1 * | 3/2011 | Wintermantel | ...... | H01Q 1/3233 342/70 |
| 2011/0285581 A1 * | 11/2011 | Hol | ................ | G01S 13/04 342/25 R |
| 2012/0056780 A1 * | 3/2012 | Antonik | ................ | G01S 7/282 342/25 B |
| 2012/0068877 A1 * | 3/2012 | Stayton | ................ | G01S 13/933 342/30 |
| 2012/0146846 A1 * | 6/2012 | Antonik | ................ | G01S 7/288 342/25 B |
| 2013/0088383 A1 * | 4/2013 | Forstner | ................ | G01S 7/02 342/372 |
| 2015/0301167 A1 * | 10/2015 | Sentelle | ................ | H01Q 9/27 342/22 |
| 2016/0025489 A1 * | 1/2016 | Klepsvik | ................ | G01S 17/42 356/5.01 |
| 2016/0116574 A1 * | 4/2016 | Joubert | ................ | G01S 13/42 342/174 |
| 2016/0131742 A1 * | 5/2016 | Schoor | ................ | H01Q 3/247 342/128 |
| 2016/0259038 A1 * | 9/2016 | Retterath | ................ | G01S 17/894 |
| 2016/0259043 A1 * | 9/2016 | Schär | ................ | G01S 13/87 |
| 2017/0072851 A1 * | 3/2017 | Shenoy | ................ | G08G 1/164 |
| 2017/0076599 A1 * | 3/2017 | Gupta | ................ | G08G 1/096716 |
| 2017/0115384 A1 * | 4/2017 | Loesch | ................ | G01S 13/42 |
| 2017/0285158 A1 * | 10/2017 | Halbert | ................ | G01S 7/414 |
| 2018/0011180 A1 * | 1/2018 | Warnick | ................ | H01Q 3/34 |
| 2018/0253151 A1 * | 9/2018 | Kletsov | ................ | A61B 5/004 |
| 2018/0259641 A1 * | 9/2018 | Vacanti | ................ | G01S 13/953 |
| 2018/0275252 A1 * | 9/2018 | Fried | ................ | G01S 7/4817 |
| 2019/0018143 A1 * | 1/2019 | Thayer | ................ | G01S 17/89 |
| 2019/0064338 A1 * | 2/2019 | Holt | ................ | H01Q 1/525 |
| 2019/0184962 A1 * | 6/2019 | Gierling | ................ | B60W 10/10 |
| 2020/0345274 A1 * | 11/2020 | Ghoshal | ................ | A61B 5/1135 |

OTHER PUBLICATIONS

U.S. Appl. No. 16/735,365, Non-Final Office Action dated Nov. 19, 2021, 59 pp.

U.S. Appl. No. 16/735,365, Notice of Allowance dated Mar. 29, 2022, 18 pp.

\* cited by examiner

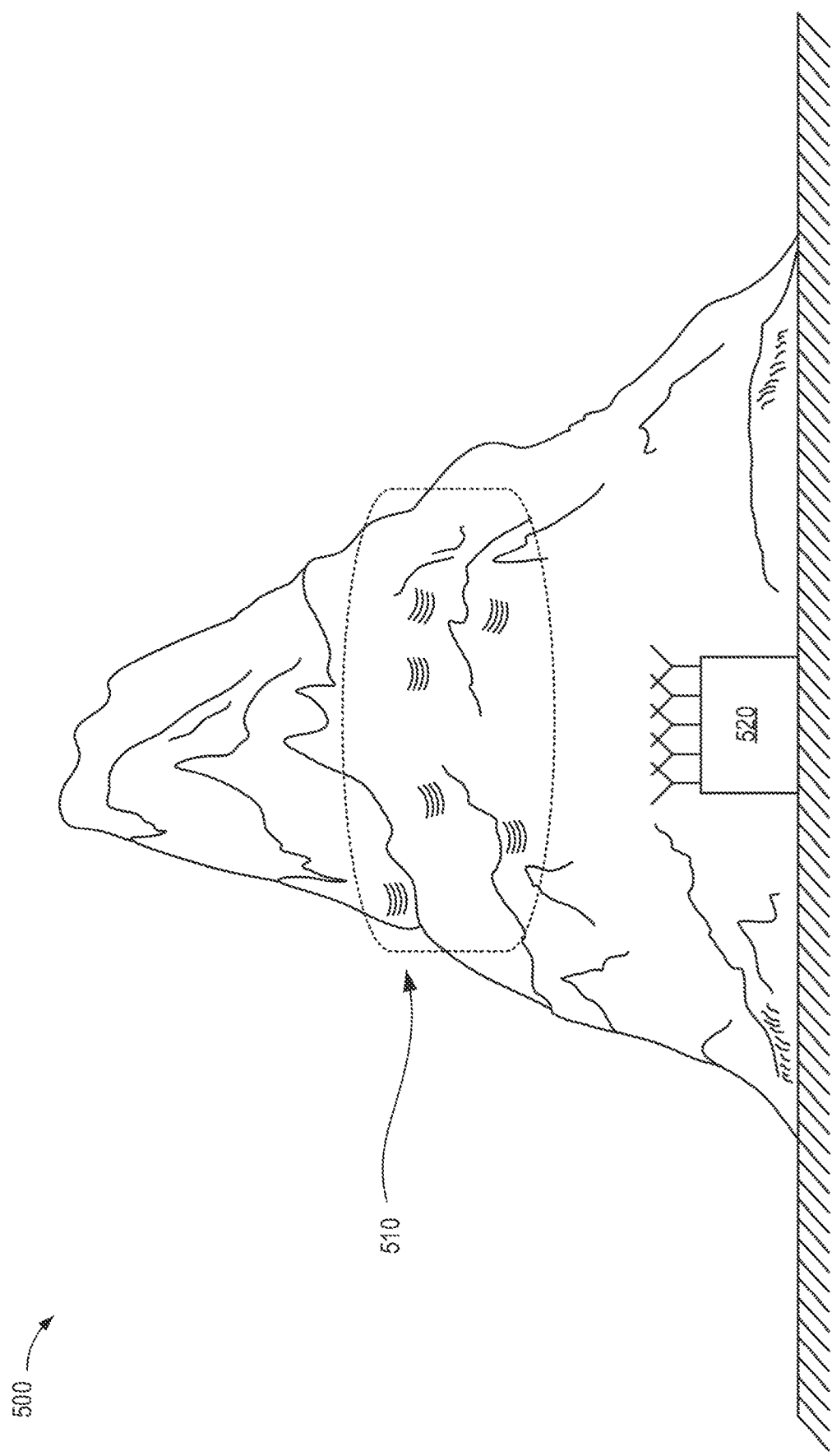

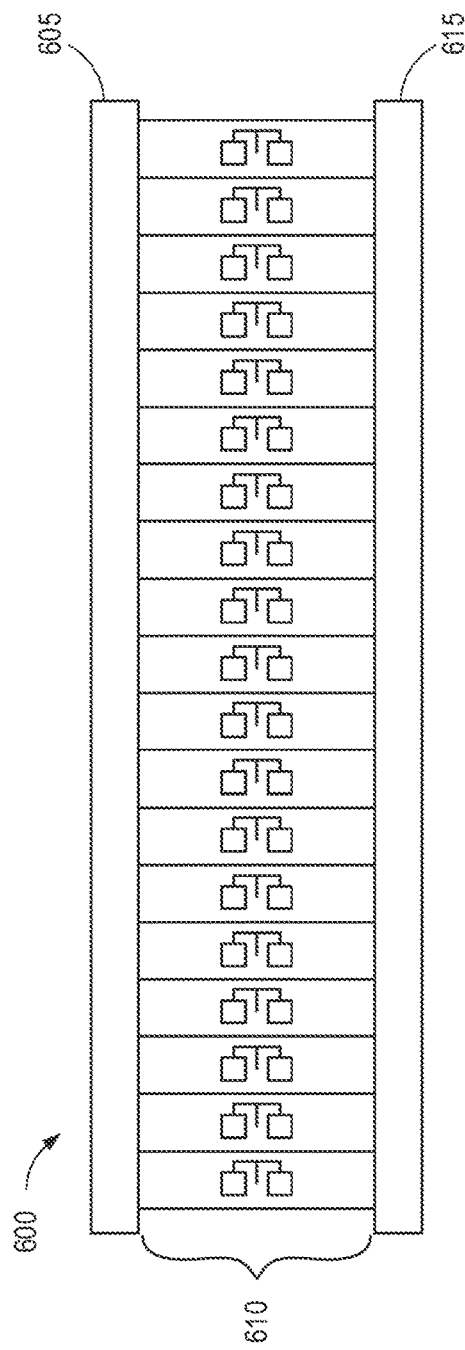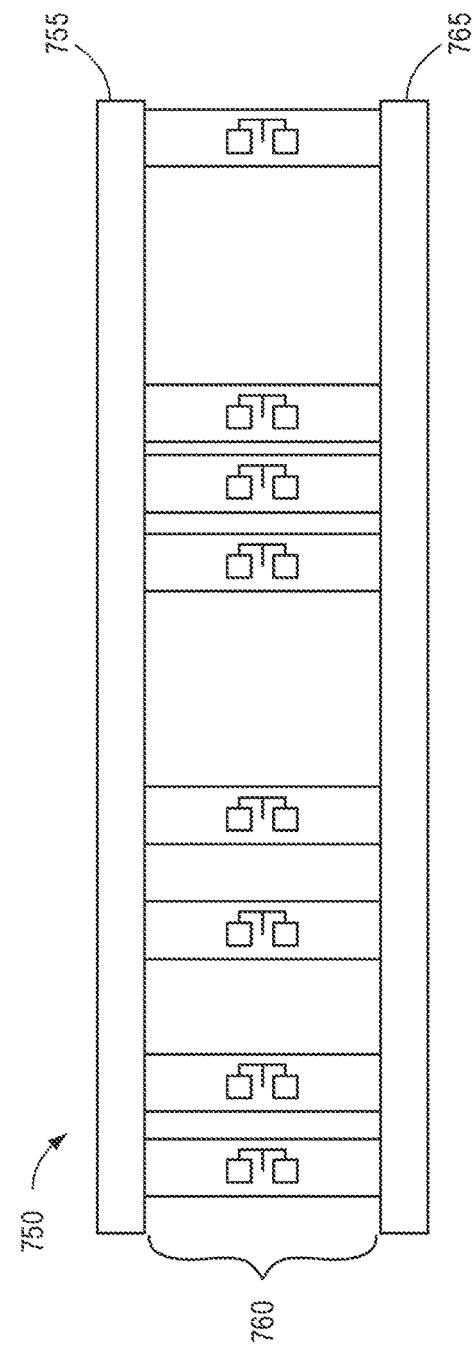

SYSTEMS AND METHODS TO DETECT MOTION ON SLOPED SURFACES

RELATED APPLICATIONS

This application is a continuation of U.S. Non-Provisional patent application Ser. No. 16/735,365 titled "Systems and Methods to Detect Motion of Sloped Surfaces," filed on Jan. 6, 2020 and issuing on Aug. 2, 2022 as U.S. Pat. No. 11,402,483, which claims priority under 35 U.S.C. § 119(e) to U.S. Provisional Patent Application 62/789,191, filed Jan. 7, 2019 titled "Radar Devices and Systems Including Examples of Avalanche Detection," which application is hereby incorporated by reference in its entirety. This application may be further understood in the context of and with comparison to U.S. patent application Ser. No. 13/149,881, filed on May 31, 2011, titled "Method, Apparatus, and System to Remotely Acquire Information from Volumes in a Snowpack," granted as U.S. Pat. No. 8,581,772, which application is hereby incorporated by reference in its entirety.

TECHNICAL FIELD

This application relates to radio frequency-based systems and methods for detecting movement. Specifically, this application describes systems and methods for detecting avalanches and other land movement.

BRIEF DESCRIPTION OF THE DRAWINGS

FIG. 5B illustrates the simplified block diagram with the system receiving six reflected chirps from various locations on a mountain slope, according to one embodiment.

FIG. 6 illustrates an example of a full array of uniformly distributed microstrip antennas, according to one embodiment.

FIG. 7 illustrates an example of a "sparse" or "thinned" array of microstrip antennas, according to another embodiment.

DETAILED DESCRIPTION

Figure 1:
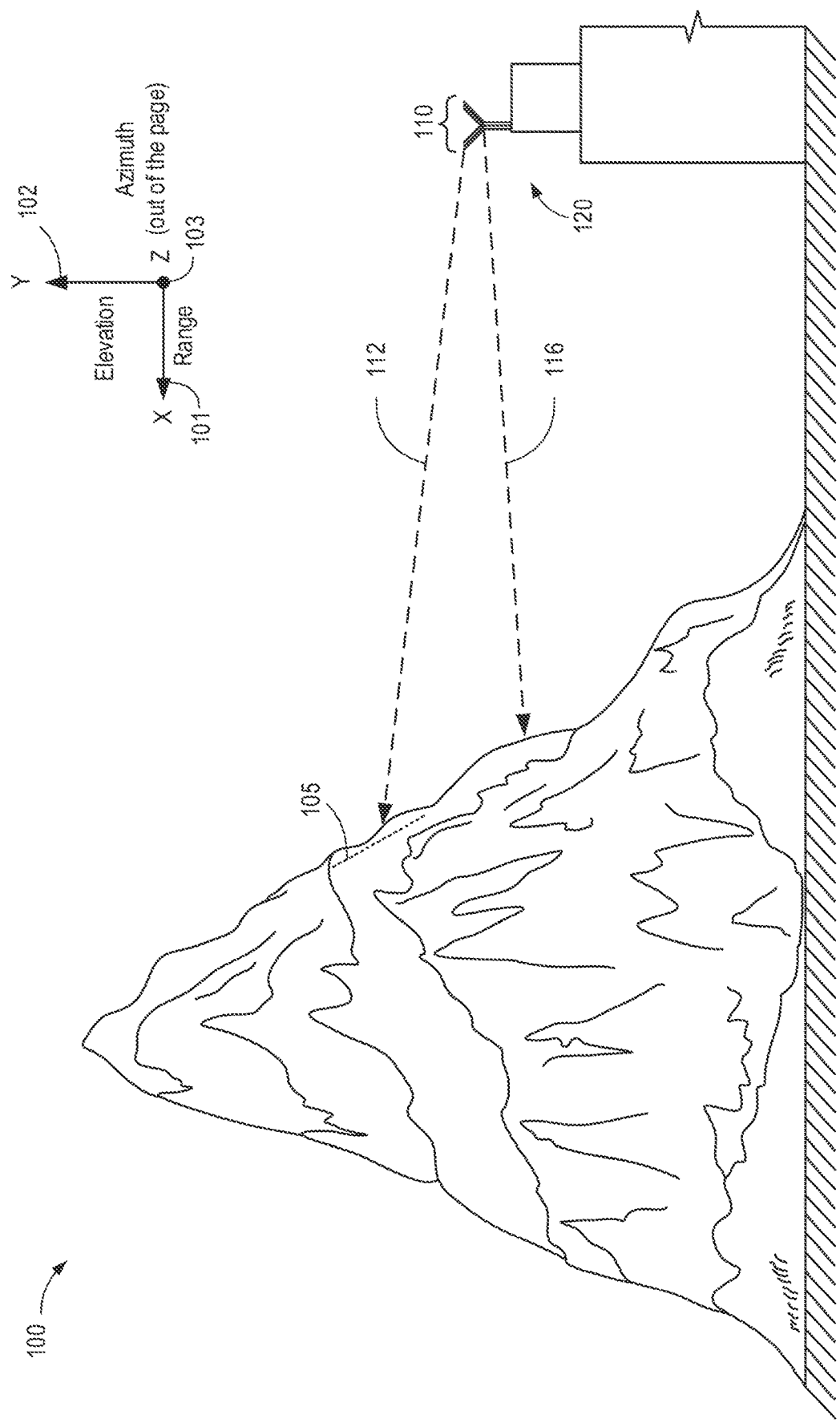
FIG. 1 illustrates a block diagram of a system to detect motion on a mountainside based on transmitted and received radio frequency (RF) chirps, according to one embodiment.

Example systems and methods are disclosed herein for detecting movement on a sloped surface, such as an avalanche or landslide. Locations on the sloped surface may be defined relative to a detection system using a three-dimensional coordinate system. For instance, the detection system may specify locations on the sloped surface in terms of azimuth, elevation, and range. A two-dimensional projection of the sloped surface may be described in terms of azimuth and elevation.

An example apparatus may include one or more transmit antennas to transmit at least one radio frequency (RF) chirp to a portion of the sloped surface. For example, a horn antenna may be used to transmit an RF chirp to a relatively large portion of a mountainside. Multiple receive antennas may receive reflected chirps from the sloped surface. The receive antennas may be arranged in a one-dimensional array.

In some embodiments, the system comprises one or more transmit antennas to sequentially transmit RF chirps to a target slope. The system may include a signal generator to generate the RF chirps or receive a drive signal from an external source. The system includes multiple receive antennas to receive reflections of transmitted RF chirps as reflected chirps from locations on the target slope. In three-dimensional space, each reflected chirp can be accurately described as originating from a location on the sloped surface defined with respect to the receiver antennas in terms of a range, an elevation angle, and an azimuth angle (e.g., in a spherical or cylindrical coordinate system).

However, in many of the embodiments described herein, reflected chirps are locationally defined with respect to a two-dimensional projection of the sloped surface. Assuming the sloped surface does not have any inverted slopes or ignoring them if it does, there is a one-to-one correspondence between elevation angle and range for a given azimuth angle. Accordingly, the location of each reflected chirp may be conveniently defined in terms of an azimuth (e.g., an x-axis coordinate) and an elevation (e.g., a y-axis coordinate) on a two-dimensional projection of a sloped surface to facilitate two-dimensional visualization of a return value. Thus, a reflected chirp is described herein as having an azimuth and an elevation in that those values define the location of the reflected chirp on the two-dimensional projection and can be mapped to three-dimensional space without any loss of specificity.

In some embodiments, the receiver antennas comprise a one-dimensional array of antennas and the azimuth is determined using digital beamforming techniques. In other embodiments, the detection subsystem determines an azimuth of each reflected chirp based on the relative positions of the receive antennas and differences in timing at which different receive antennas detect the reflected chirp. In some instances, the detection system may additionally or alternatively use differences in the phase angle at which different receive antennas detect the reflected chirp.

The detection subsystem may calculate an elevation angle of each reflected chirp based on a calculated distance (e.g., based on a time-of-flight) that each reflected chirp traveled, the determined azimuth angle of the reflected chirp, and a known topography of the mountainside. For example, the topography of a mountain may be known or previously calculated such that, for a given azimuth angle, there is a one-to-one correspondence between the distance to the surface of the mountainside and the elevation angle. For instance, for a given azimuth, the base of the mountain might be at a distance of two kilometers and the peak of the mountain might be at a distance of four kilometers. Assuming the topography between the base and the peak is known, there is a one-to-one correspondence between the distance to the surface of the mountain and the angle of elevation. The system may ignore portions of a mountainside that are inverted since inverted slopes cannot accumulate snow or debris that may eventually lead to an avalanche or landslide.

The system may also determine one or more return values of each received reflected chirp, such as phase shifts and/or power levels. Accordingly, for each transmitted RF chirp, the system may receive a large number of reflected chirps from various locations on the mountainside. The system may identify the location from which each reflected chirp originated and determine a phase shift, power level, or other return value. For a sequence of transmitted RF chirps, the system may generate sequential return value representations of the target slope based on reflected chirps from multiple locations on the target slope. The representation may be a mathematical representation (e.g., a three-dimensional or four-dimensional matrix) or an imaging representation. For example, the system may generate an imaging representation of the mountainside as a two-dimensional projection with azimuth along one axis and elevation along the other axis. Various color or grayscale shades may be used to represent the varying return values of reflected chirps from each azimuth-elevation location on the imaging representation.

Movement of objects on the mountainside affects the return values of reflected chirps. Thus, movement on the mountainside can be identified by comparing the representation over time. Small movement may be attributed to animals or humans, while large-scale movement across a large portion of the representation may be indicative of an avalanche or landslide. The system may detect motion events based on variations in return value representations from one moment to another. Detected motion events that match defined movement patterns or exceed defined thresholds may be flagged and reported. In some embodiments, motion events identified by the system may be characterized and described by humans after the fact. The system may improve motion event characterization over time through the use of computer learning, artificial intelligence techniques, neural network machine learning approaches, and the like.

In various embodiments, the return value representations of the target slope are generated as imaging representations in an azimuth domain (or range domain) to facilitate visual analysis by humans. The two-dimensional projection of the mountainside in the range domain may be easily identifiable and similar to a map of the mountainside.

In various embodiments, the transmitted RF chirp may be generated by a signal generator comprising a radio frequency mixer that mixes an oscillating frequency signal and a transmission signal.

The detection subsystem described herein may comprise hardware, firmware, and/or software implemented by a process. For example, the detection subsystem may include one or more of a field-programmable gate array (FPGA), an application specific integrated circuit (ASIC), or a processor and computer-readable medium with instructions stored therein that, when executed by the processor, cause the processor to determine the elevation and azimuth information as described above.

In one specific embodiment, the detection subsystem may be partially implemented using a plurality of receive mixers to mix each transmitted RF chirp with reflected chirps received by each of the receive antennas to generate difference signals. The difference signals may be processed to determine elevation and azimuth information as described herein.

While specific embodiments are described herein, it is appreciated that many different combinations of hardware, firmware, and software may be used to implement the systems described herein. Accordingly, this application encompasses any combination of components designed to transmit a sequence of RF chirps to a target mountainside, receive reflected chirps from various locations, determine an azimuth of each reflected chirp, and determine an elevation of each reflected chirp based further on a time-of-flight of each reflected chirp, and a known topography of the mountainside.

Many embodiments of the systems described herein may be utilized to detect avalanches and/or landslides. Providing a warning signal at the start of an avalanche can save lives by giving the time for potential victims to get out of the way, close roads, and/or close trails potentially affected by the slide. In addition, providing a warning signal can facilitate the response of emergency personnel (e.g., more rapidly than without that warning signal). Further, knowing a location, size, and/or other metrics of an avalanche may help in forecasting future avalanches or for developing mitigation plans.

While examples described herein include devices and methods in the context of avalanche detection on a mountain slope, it can be appreciated that the systems and devices described herein may also be utilized in the detection of various objects moving across a portion of land. The movement of land or objects on land could also be detected by the devices and methods herein to provide a warning signal to potential victims. For example, falling rocks may be detected on a mountain slope and a warning signal may be provided to potential victims and/or facilitate the response of emergency personnel. As another example, moving objects on the land may be detected by the devices and methods described herein, such as skiers skiing down a mountain slope.

In some embodiments, the system may detect the number of skiers affected or potentially affected by an avalanche. In other embodiments, the systems and methods described herein may be used to detect the movement of people into and/or out of an area, such as a building, stadium, or other public, private, secured, or unsecured location.

The systems and methods described herein can operate with one or more transmit antennas and a one-dimensional array of receive antennas. In fact, in some embodiments, a sparse or thinned one-dimensional array of receive antennas may be utilized. As described herein, the azimuth may be determined through digital beamforming or other digital signal processing techniques based on the arrival time of reflected chirps at the various receive antennas and/or the received phase angle differences. The elevation is determined based on calculated distances (e.g., based on time-of-flight measurements) and a known static topography of a mountainside. Knowledge of the topography of the mountainside allows the system to operate with reduced complexity and reduced cost. The presently described systems and methods avoid the cost and complexity of conventional radar systems that may operate by mechanically rotating an antenna and/or include complex and costly phased arrays. Furthermore, the presently described systems and methods allow for a snapshot of return values (e.g., power levels and/or phase shifts) to be captured for an entire portion of a mountainside after each transmitted RF chirp. The approach described herein is different than and in contrast to systems that use raster-scanning or rotational slice-scanning.

The range resolution of the systems described herein may be selected based on the pulse length of transmitted RF, frequency and/or phase modulation of transmitted RF coupled with matched-filter compression, and/or the bandwidth of the modulation. Modulation schemes such as linear frequency modulation (LFM) make fine range resolution practical and provide adequate bandwidth. The azimuth (or cross-range) resolution of the system is associated with the effective antenna azimuth beamwidth, which is determined in part based on antenna size and the center frequency used.

The azimuth resolution (e.g., 'over the ground') can be calculated as the azimuth beamwidth by the range. To achieve fine azimuth resolution with a real-aperture antenna, large antenna sizes are typically utilized, even when the radio frequencies used are very high. Smaller antennas generally have wider azimuth beams and correspondingly coarser azimuth resolutions.

In some embodiments, a system may include multiple fixed antennas and a processor or other controller to generate multiple antenna beams that cover a target area using digital signal processing (DSP). For example, DSP may be used to generate beamforms that cover a target area across an azimuth axis parallel to an alignment of a fixed antenna array. In some embodiments, the system may utilize linear frequency modulation (LFM) to increase range resolution.

In some embodiments, a return value representation (e.g., a power level map image of a mountainside) may be generated for each transmitted RF chirp. In other embodiments, multiple received reflected chirps may be averaged over time to generate each return value representation. As a specific example, N samples of received reflected chirps may be received, for example, over a time period of T length. The T length of the time period may be a time length, such as 10 nanoseconds, 10 milliseconds, or 1 second.

The system may identify changes in power levels of reflected chirps from a target region as indicative of movement. Similarly, the system may identify changes in the phase shifts of reflected chirps from a target region as indicative of movement. In some embodiments, movement may only be identified if both changes in power levels and changes in phase angle indicate movement. Moving objects may shift or modulate the phase and/or power level of reflected chirps. Detected power levels of received reflected chirps returned from moving objects may vary due to deflections of the transmitted RF chirps at different angles, phase shifts in the reflected chirps, and/or variations in absorption of the transmitted RF chirps.

Each different spatial pattern of power level changes over time may correspond to different movement types. For example, one spatial pattern of power level changes over time may correspond to movement of a skier. Another spatial pattern of power level changes over time may correspond to movement of a hiker or an animal. The system may identify other spatial patterns of movement (power level changes over time) as corresponding to avalanches or landslides.

Threshold and constant false alarm (CFAR) techniques may be utilized to detect temporal changes that indicate an avalanche in progress. When a sufficiently large area in an image is changing or moving, as detected by a processor executing a detection routine, an avalanche indication may be sent or reported that provides a notification that an avalanche is in progress. For example, the processor may provide a text-based notification to a cell phone, an electronic notification through a cloud-based computer server, an audible alarm, a visual alert, and/or the like.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, and/or modules as described herein may be combined as a single system, subsystem, module, or component. Moreover, many of the systems, subsystems, components, and modules may be duplicated or further divided into discrete systems, subsystems, components, or modules to perform subtasks of those described herein. Any of the embodiments described herein may be combined with any combination of other embodiments described herein. Many of the embodiments of the systems and methods described herein that appear to be mutually exclusive may be used in combination as weighted functions of one another and/or in primary-backup configurations in which one embodiment is used primarily, and the other embodiment is available as a backup.

As used herein, a computing device, system, subsystem, module, or controller may include a processor, such as a microprocessor, a microcontroller, logic circuitry, or the like. A processor may include one or more special-purpose processing devices, such as an application-specific integrated circuit (ASIC), a programmable array logic (PAL), a programmable logic array (PLA), a programmable logic device (PLD), a field-programmable gate array (FPGA), or another customizable and/or programmable device. The system may also include a computing device with a machine-readable storage device, such as non-volatile memory, static RAM, dynamic RAM, ROM, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. Many descriptions and variations of antennas described in terms of transmitters are equally applicable to receivers, and vice versa, unless context or functionality dictates otherwise.

FIG. 1 illustrates a block diagram 100 of a system 120 to detect motion on a target area 105 of a mountainside based on transmitted and received radio frequency (RF) chirps, according to one embodiment. The system 120 includes antennas 110 to transmit RF chirps 112 and 116 onto a mountain slope. The RF chirps 112 and 116 may cover all or a portion of the mountain slope. The system 120 may include any number of transmit antennas 110, and the coverage of area (i.e., beam width/shape) of each transmit antenna 110 may depend on the power level of transmitted RF chirps. For example, the system 120 may be specifically adapted to monitor movement on target area 105 of the mountain slope that is avalanche prone.

As illustrated, the antennas 110 of the system 120 are oriented toward the mountain slope along a range axis 101 (X-axis) such that the RF chirps transmitted by the system 120 are transmitted along the range axis 101 with a beamheight defined in an elevation axis 102 (Y-axis) and a beamwidth defined in an azimuth axis 103 (Z-axis). In other embodiments, system 120 operations may be spatially defined using a polar coordinate system with standard azimuth, range, and elevation values. The system 120 may repeatedly transmit a single RF chirp that covers the entire target area. Alternatively, the system 120 may transmit RF chirps at different elevations and/or at different azimuth angles during each time period. The system 120 may include any number or configuration of the transmit antennas 110. The transmit antennas 110 may each or collectively have a fixed position such that transmitted RF chirps do not vary along the elevation axis 102.

Figure 2A:
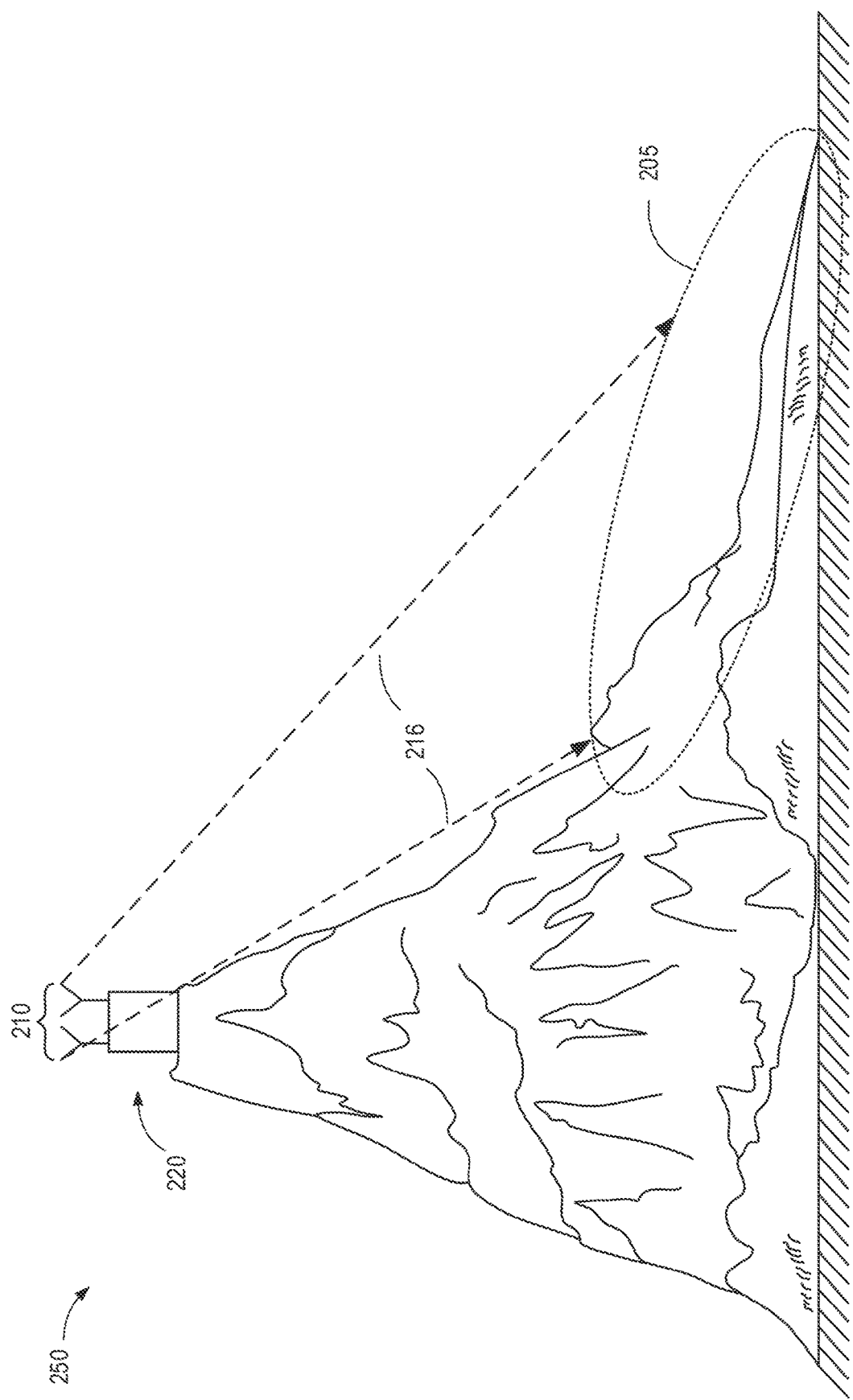
FIG. 2A illustrates a block diagram of a system on a mountainside to detect motion on the ground based on transmitted and RF chirps, according to one embodiment.

FIG. 2A illustrates a block diagram 250 of a system 220 on a mountainside to detect motion in a target area 205 near the ground based on transmitted and received RF chirps, according to one embodiment. The system 220 includes transmit antennas 210 to transmit a beamformed RF chirp 216 onto the target area 205, which is a sloped surface relative to the transmitted RF chirp 216. The system 220 can be positioned at any location to detect movement on any surface that is sloped with respect to the plane of the receive antennas.

Figure 2B:
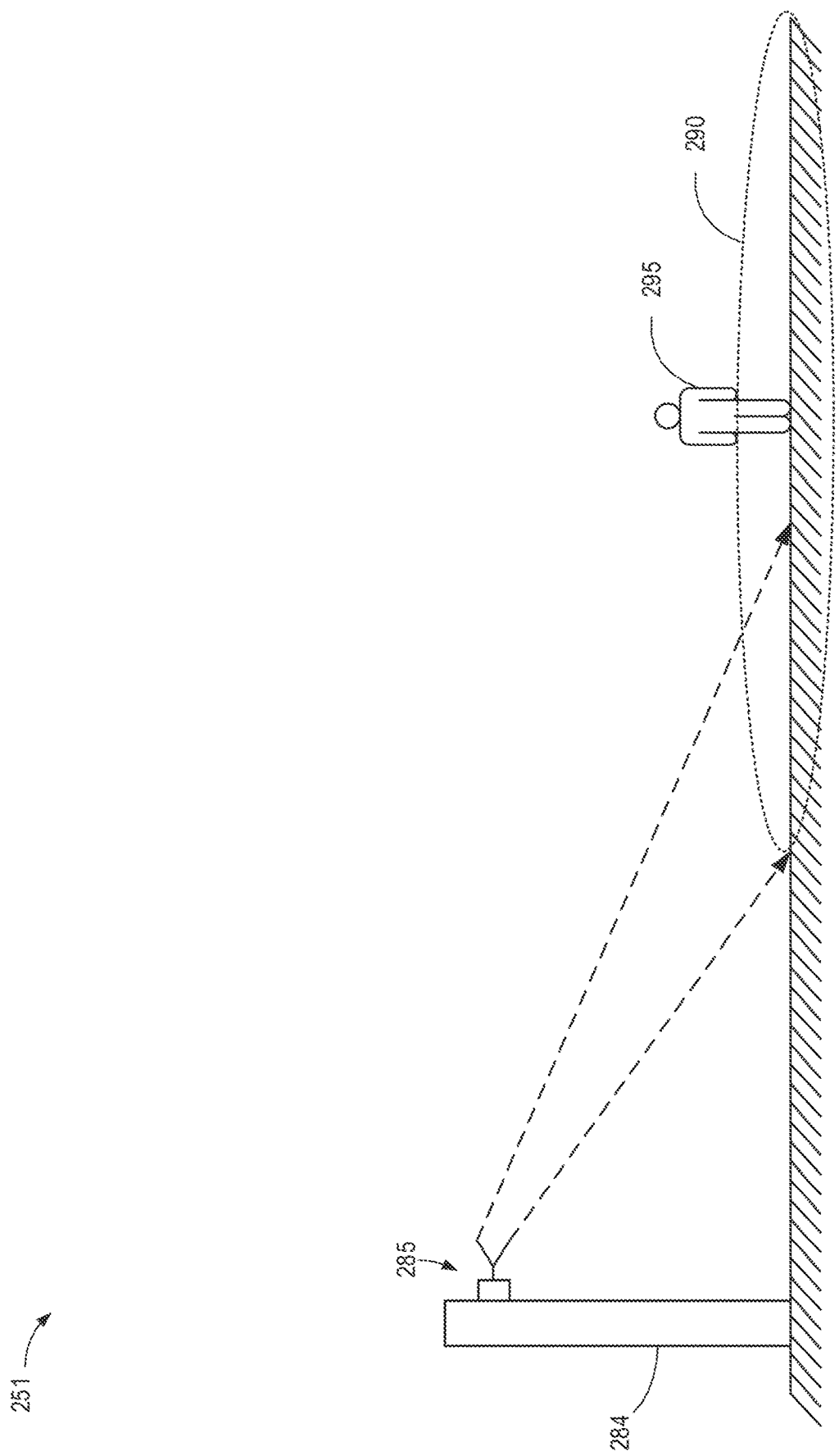
FIG. 2B illustrates another block diagram of a system on an elevated platform to detect motion on the ground based on transmitted and received RF chirps, according to various embodiments.

FIG. 2B illustrates another block diagram 251 of a system 285 on an elevated platform 284 to detect motion of a human 295 within a target area 290 on the ground based on transmitted and received RF chirps, according to various embodiments. In some embodiments, the system 285 may be integrated as part of a structure, such as a building, lamppost, or cellular tower.

Figure 3:
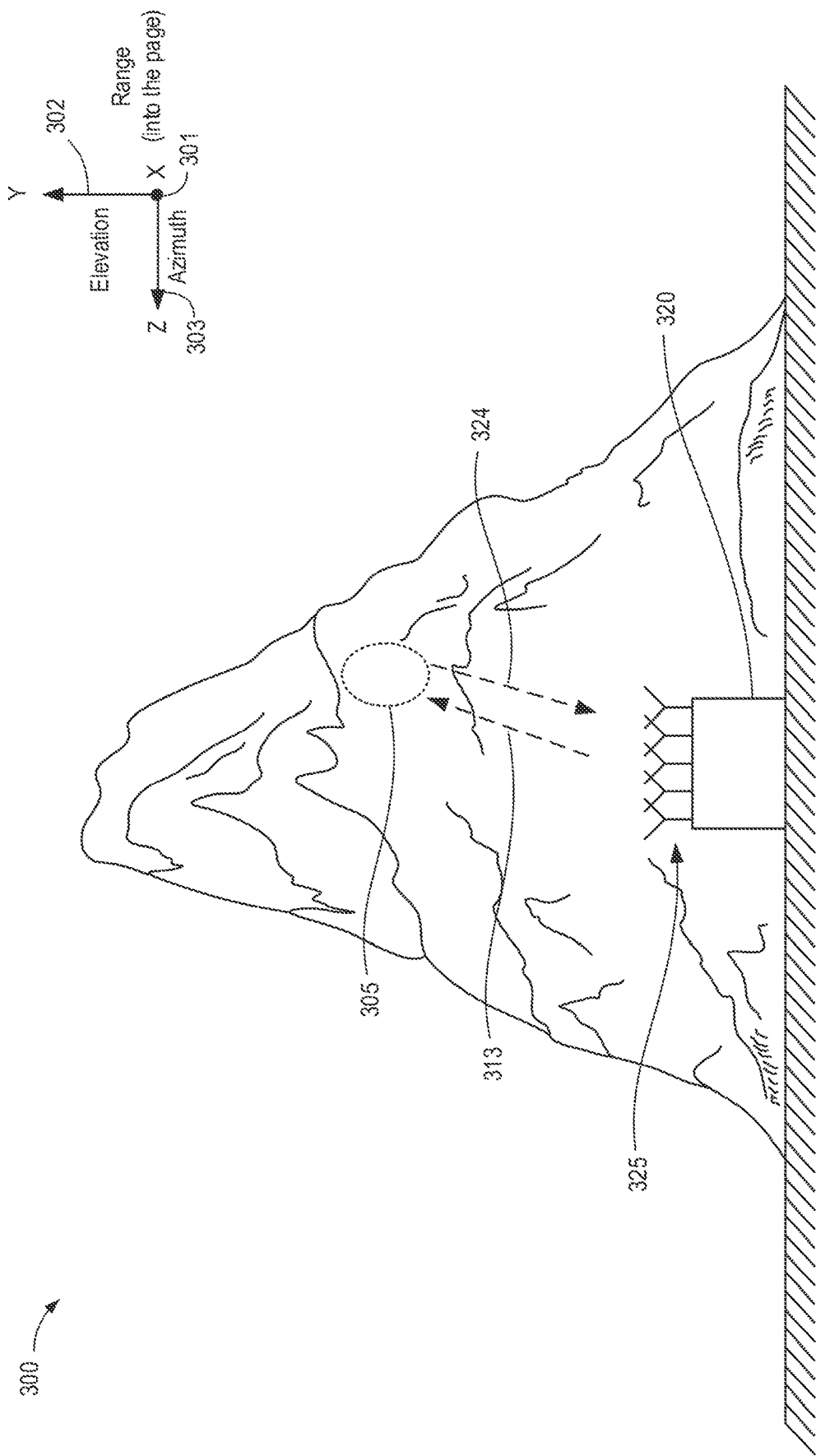
FIG. 3 illustrates a block diagram of a system to detect motion on a target portion of the mountainside based on transmitted and received RF chirps, according to various embodiments.

FIG. 3 illustrates a block diagram 300 of a system 320 to detect motion on a target portion 305 of the mountainside based on transmitted and received RF chirps, according to various embodiments. The system 320 includes multiple antennas 325. At least one antenna 325 is a transmit antenna to transmit RF chirps 313 to the target portion 305 of the mountainside. The transmit antenna(s) may be selected to generate a particular beampattern corresponding to the target portion 305 of the mountainside. For example, the transmit antenna(s) may comprise a horn antenna, a phase array of antennas, a parabolic reflector, one or more microstrip antennas, and/or another beamforming antenna type.

At least two of the antennas 325 are receive antennas. The receive antennas may be, for example, a full or thinned array of microstrip antennas to receive reflections of the transmitted RF chirps 313 as reflected chirps 324. As illustrated, the system 320 may be oriented towards the mountain with the planar receive surface of the array of microstrip antennas substantially parallel with the azimuth-elevation plane (Z-Y plane) with the individual receive antennas extending along the azimuth dimension 303 (the Z-axis). The antennas 325 may be positionally fixed (i.e., they do not rotate or tilt during operation) along the azimuth axis 303. The range axis 301 (X-axis) is orthogonal to the azimuth axis 303 and the elevation axis 302 (Y-axis). The transmit antenna(s) and/or receive antennas 325 may be configured during manufacturing or adjusted during setup to have a fixed transmit and receive elevation angle for beamforming to the target portion 305 of the mountainside. In some embodiments, distinct RF chirps (e.g., uniquely modulated, different frequencies, encoded, etc.) may be transmitted at different elevations such that received reflected chirps can be coarsely identified as originating from a specific elevation on the mountainside.

Each of the plurality of receive antennas 325 of the system 320 may receive reflected chirps 324 from the target area 305. The reflected chirps 324 may be received at respective receiving antennas at different times and/or at different phase angles. For example, since the target area 305 is to the right of the system 320, the right-most receive antenna will receive reflected chirps before the left-most receive antenna. Similarly, the reflected chirps may be received at different phase angles due to the different travel distances from the origin location of a given reflected chirp. The system may calculate an azimuth angle to the location on the mountainside from which each received reflected chirp originated using the distances between the receiving antennas and (i) the different phase angles at which each receive antenna receives a reflected chirp and/or (ii) the slightly different times at which each receive antenna receives a reflected chirp. The time differences and/or phase angle differences correspond to precise distances, allowing the azimuth angle to be calculated to a high degree of precision using trigonometric identities, triangulation algorithms, multi-antenna angle of detection methods, and the like.

Figure 4A:
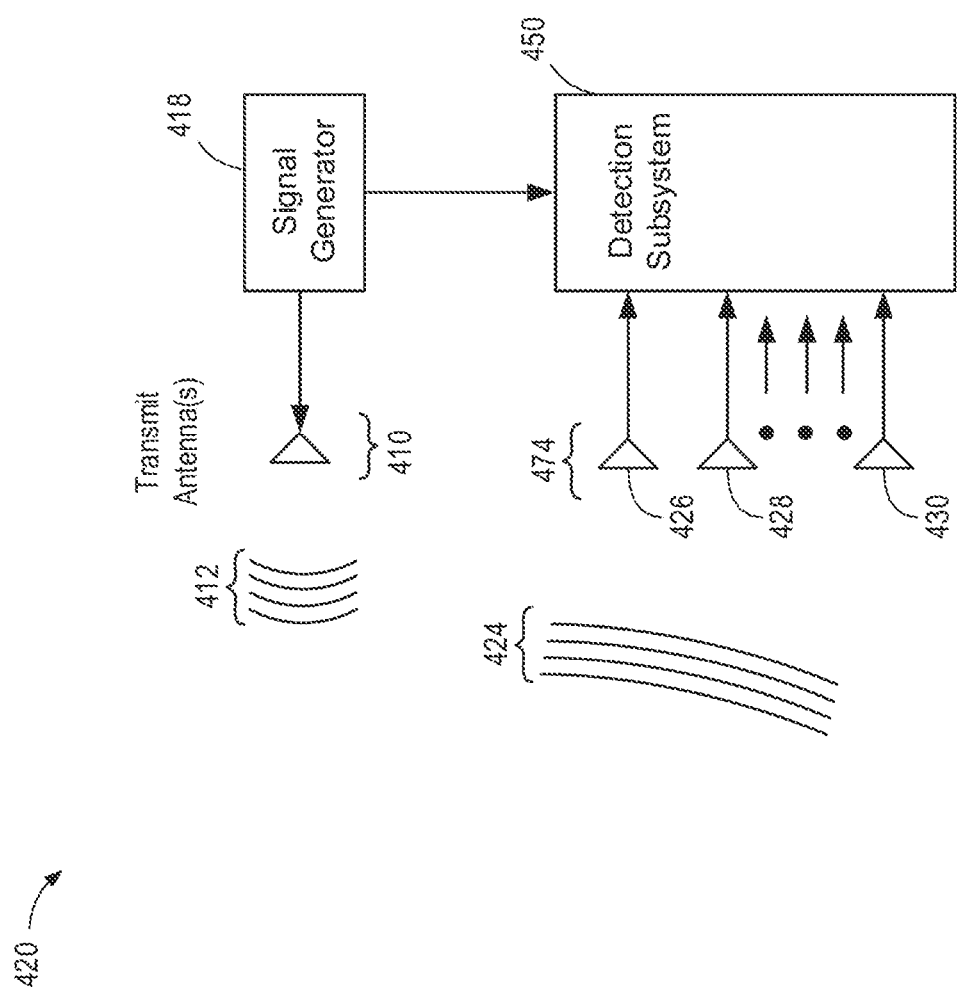
FIG. 4A illustrates a block diagram of a system to detect motion on a sloped surface, according to various embodiments.

FIG. 4A illustrates a block diagram of a system 420 to detect motion on a sloped surface, according to various embodiments. At a high level, the system 420 may include a signal generator 418 that generates an electrical chirp signal for transmission by the transmit antenna 410 as an RF chirp 412. In some embodiments, the system 420 may not have an integrated signal generator 418. Instead, the system 420 may include an input port to receive an electrical chirp signal from an external signal generator. As described herein, a single transmit antenna 410 may be used to transmit the RF chirp 412 to a single portion or region of a mountainside (e.g., a target slope 510). In other embodiments, multiple transmit antennas may be used to transmit the RF chirp 412 to the single portion or region of the mountainside or other sloped surface.

In still other embodiments, multiple transmit antennas may be used to collectively transmit unique RF chirp signals to different portions or subregions of a sloped surface. In such embodiments, reflected chirps may be coarsely identified as originating from one of the different portions or subregions. Higher resolution localization can be performed as described above, by first determining an azimuth from which the reflected signal originates and then determining an elevation based further on time-of-flight measurements and a known topography of the sloped surface.

The detection subsystem 450 is connected to a one-dimensional array of receive antennas 474, including receive antennas 426, 428, and 430. The array of antennas 474 receives reflections of the transmitted RF chirps as reflected chirps 424 from each of a plurality of locations that can each be defined in terms of azimuth and elevation on the sloped surface. For each of a plurality of reflected chirps 424 received by the array of receive antennas 474, the detection subsystem 450 may determine an azimuth of the reflected chirp. In the illustrated example, the receive antenna 426 will receive the reflected chirp 424 earlier and at a different phase angle than, for example, receive antenna 430.

The system may utilize measured phase angle differences and known distances between the various receive antennas 426, 428, and 430 to calculate an azimuth angle at which the reflected chirp 424 is received. In other embodiments, the azimuth angle at which the reflected chirp 424 is received can be determined using triangulation based on the difference in arrival times of the reflected chirp 424 at each of the receive antennas 426-430. Additionally or alternatively, the azimuth angle of the reflected chirp 424 can be determined using the principles and approaches described in "Determining RF Angle of Arrival using COTS Antenna Arrays: A Field Evaluation" by Hseih-Chung Chen, et al., School of Engineering and Applied Sciences, Harvard University (2012), which is hereby incorporated by reference in its entirety.

The detection subsystem 450 may determine an elevation for each reflected chirp 424 based on a time-of-flight of the reflected chirp 424, the azimuth of the reflected chirp 424, and the known distances from the system 420 to each unique location on the target slope. For a given azimuth angle, there is a one-to-one correspondence between distances to the sloped surface and elevation angles. The detection subsystem 450 can determine the distance traveled by the reflected chirp 424 based on the calculated time-of-flight of the reflected chirp 424.

The detection subsystem 450 may also identify a return value associated with each reflected chirp 424. For example, the detection subsystem 450 may identify a power level associated with each reflected chirp 424. In other embodiments, the detection subsystem 450 may alternatively or additionally identify a phase shift associated with each reflected chirp 424. The detection subsystem 450 may generate sequential return value representations of the sloped surface based on reflected chirps 424 from multiple locations on the target slope. Each return value representation comprises a mapping of return value representations to associated azimuths and elevations, or alternatively to associated azimuths and ranges.

In some embodiments, the detection subsystem 450 may generate an imaging representation of the return values. For example, the detection subsystem 450 may generate a two-dimensional image that spatially maps to the target area on the sloped surface with one dimension corresponding to the azimuth and the other dimension corresponding to the elevation. The return values of reflected chirps 424 at each azimuth-elevation coordinate may be represented by letters, numbers, percentages, symbols or the like. In some embodiments, the return values of reflected chirps 424 at each azimuth-elevation coordinate may be represented by different colors or grayscale values. In other embodiments, the system 420 may not present users with visualizations of the return values, in which case the return value representations may comprise a multidimensional data structure, such as a matrix or an array data structure, to facilitate subsequent computer processing.

The system 420 may transmit an RF chirp 412 once every time period, t. During each time period, t, the detection subsystem 450 may process a number, N, of reflected chirps 424 by determining a location (e.g., defined in terms of azimuth and elevation) from which the reflected chirp 424 originated and an associated return value (e.g., a power level or phase shift). The detection subsystem 450 may generate a return value representation every time period, t, in which case each return value representation would include N unique return values.

In another embodiment, the detection subsystem may generate a return value representation every $k^{th}$ time period, where k is a numerical constant, such that each return value representation comprises k*N unique return values. Each return value representation provides a snapshot in time, or a "frame," of the return values of the reflected chirps received during each kt time period. Changes in return values at a given location from one frame to another indicate movement at that location that modified the return value of reflected chirps at that location.

The detection subsystem 450 may analyze sequences of two or more return value representations to detect motion. Different patterns of motion may be associated with different types of motion events. For example, a pattern of motion may be detected that is identified as leaves blowing in the wind. A different pattern of motion may be associated with movement of a human or animal. Yet another pattern of motion may be associated with vehicle movement. The detection subsystem 450 may distinguish between a human or animal movement and a vehicle based on, for example, the size of the object moving and/or the speed of the movement. The detection subsystem 450 may detect an avalanche or landslide motion event based on the shape of the movement and/or the speed of the movement. For example, the detection subsystem 450 may detect avalanche or landslide motion by comparing frame k with frame k+m, where m is an integer value.

In some embodiments, the detection subsystem 450 may use a set of return value representations to establish baseline return values. For example, the detection subsystem 450 may identify baseline power levels and/or phase shifts associated with steady-state or normal mountainside conditions. The detection subsystem 450 may identify motion in subsequent frames based on power levels and/or phase shifts exceeding the baseline levels and/or exceeding threshold values. For example, steady-state power levels may be normalized to a baseline value 50 on a scale of 0 to 100 in return value representations. Some deviation from the normalized baseline value of 50 may be attributed to noise or minor motion events. However, the detection subsystem 450 may identify received power levels exceeding the baseline values by more than a threshold amount as a motion event.

In some embodiments, certain spatial regions may be associated with a higher likelihood of an avalanche, in which case the detection subsystem 450 may be more likely to classify or categorize a detected motion pattern as an avalanche or landslide. External inputs, such as temperature, wind conditions, time of day, and other environmental data may further guide the detection subsystem 450 in classifying or categorizing a detected motion pattern. For example, if it is windy, detected motion across a large spatial region is more likely to be attributed to tree or leaf movement. If the temperature is reported as 35° C., the detection subsystem 450 may decrease the probability that detected motion is an avalanche. Conversely, if environmental conditions are likely to contribute to avalanches, then the detection subsystem 450 may increase the probability that detected motion is associated with an avalanche.

The system 420 may transmit a communication or otherwise report that a motion event has been detected. In some embodiments, the system 420 may provide a visual, audible, and/or haptic alarm. The system 420 may be configured to report or provide an alarm for some types of detected motion, but not others. For example, the system 420 may identify the motion of skiers descending a ski slope and keep count of the number of skiers in each subregion of a monitored target slope. However, the system 420 may not alarm or report the detected skiers because the motion is expected and acceptable. However, if a motion event is detected that is indicative of an avalanche, the system 420 may trigger an alarm or otherwise report that an avalanche has been detected. The detection subsystem 450 may generate a composite return value representation that shows motion associated with the avalanche over many time periods, t, to provide a visualization of the avalanche movement from the start of the avalanche to the end of the avalanche. Furthermore, the detection subsystem 450 may identify the number of skiers, vehicles, animals, or other detected persons or objects that may be impacted by the avalanche.

Figure 4B:
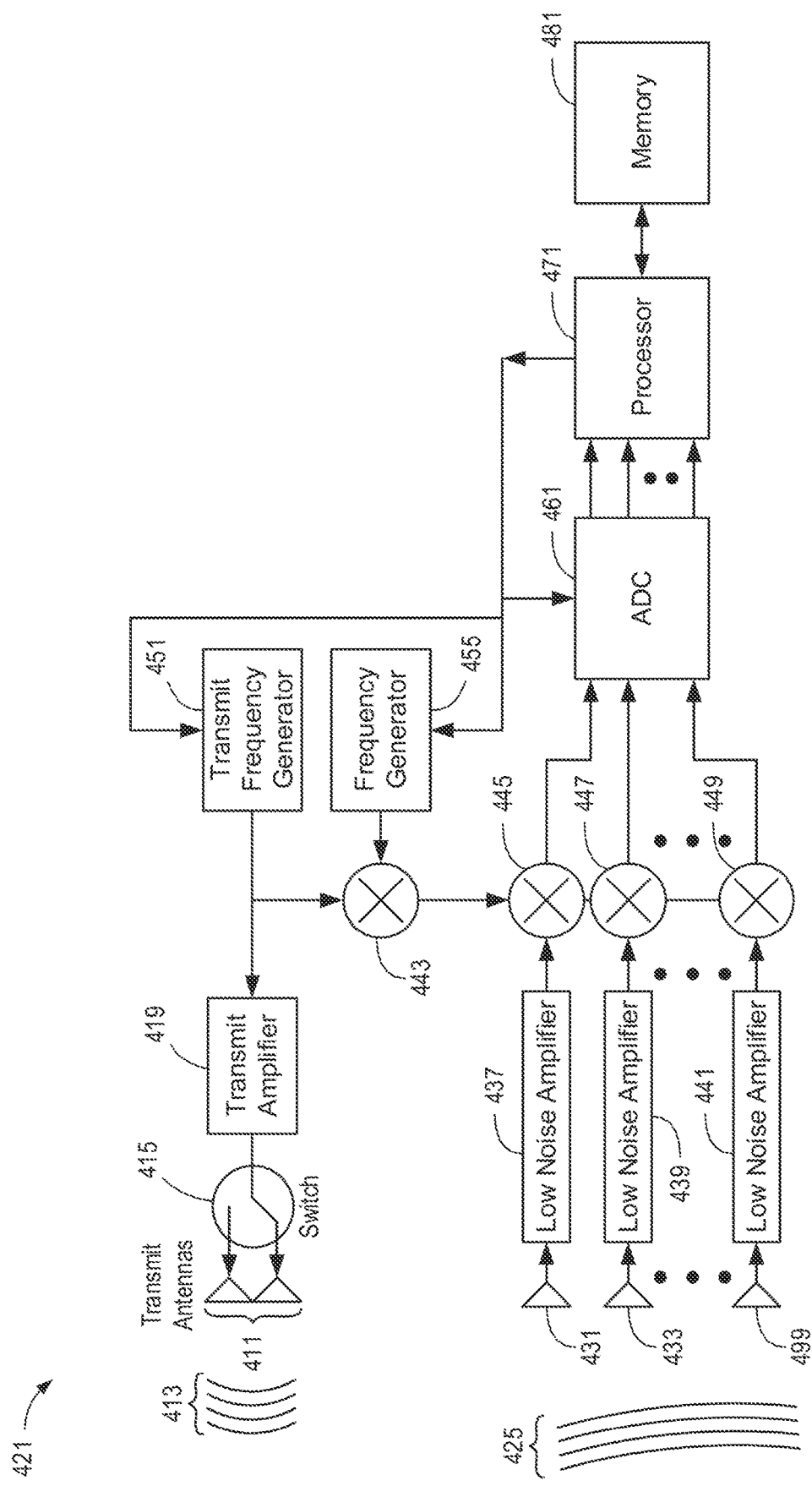
FIG. 4B illustrates another block diagram of a system to detect motion on a sloped surface, according to one specific embodiment.

FIG. 4B illustrates another block diagram of a specific embodiment of a system 421 to detect motion on a sloped surface, according to one specific embodiment. The system 421 includes two transmit antennas 411 to transmit RF chirps 413. A transmit frequency generator 451 generates an electrical chirp signal that is amplified by transmit amplifier 419 prior to transmission by one of the transmit antennas 411, depending on the state of a switch 415. The system 421 may transmit unique RF chirps 413 with each different transmit antenna 411. Alternatively, the transmit antennas 411 may transmit the same RF chirp 413 to different locations on the sloped surface. For instance, the power output of the system 421 may not be sufficient to provide a target signal-to-noise ratio for a large target portion of the sloped surface. Accordingly, the transmit antennas may each have a fixed steering angle and beamshape to irradiate part of the target portion.

The system 421 includes receive antennas 431, 433, and 499 to receive reflected chirps 425. The receive antennas 431, 433, and 499 convert received RF signals to electrical signals that are amplified by low-noise amplifiers ("LNAs") 437, 439, and 441. In some embodiments, low-pass filters may be utilized in conjunction with or instead of low noise amplifiers 437, 439, and 441. Mixers 445, 447, and 449 receive the amplified reflected chirps and mix them with a function of the electrical chirp signal generated by the transmit frequency generator 451 offset by a fixed frequency from a frequency generator 455. For example, the received reflected signals may be amplified by the LNAs 437, 439, and 441 and mixed with the transmitted electrical chirp signal from the transmit frequency generator 451 offset by a 10 MHz signal generated by the frequency generator 455 (e.g., a local oscillation signal used as a reference signal in the system 421).

The output of the mixers 445, 447, and 449 is a difference signal, or a downconverted chirp. As represented by black dots between receive antennas 433 and 499 and mixers 447 and 449, any greater number of receive antennas and associated mixers may be utilized. In one specific embodiment, two horn antennas are used as transmit antennas 411 and eight microstrip receive antennas in a thinned array are used for the receive antennas 431-499. A corresponding number of LNAs 437-441 and mixers 445-449 may be utilized. Alternatively, received reflected chirps from a large number of receive antennas may be stored temporarily and time-multiplexed through a fewer number of LNAs 437-441 and mixers 445-449.

The mixed signals are digitally converted by analog-to-digital converter (ADC) 461. A processor 471 (or another controller or control system) receives the digitized signals and generates return value representations (e.g., images of the relative power levels of reflected chirps at various calculated locations). The processor 471 may perform various signal processing operations on the information in the digitized signals, for example, as described herein with reference to FIGS. 8A-8J. The processor 471 receives sampled received data, such as the digitized signals, from each of the receive channels of various down-conversion configurations. Each received signal may include fast-time sampled measurements for each channel. The fast-time dimension may refer to the sampled data for a specific receive channel during a specific time period. A slow-time dimension refers to the sampled data of one or more receive channels over several time periods. Accordingly, the information received via the receive channels may be considered in three dimensions, for example, as a three-dimensional graphical representation. The processor 471 may be a parallel processor with each channel of the parallel processor receiving a corresponding receive channel from the ADC 461.

The processor 471 may provide control instructions to the transmit frequency generator 451 and the frequency generator 455. For example, the processor 471 may specify the range of frequencies that the transmit frequency generator 451 uses to generate the electrical chirp signal to be transmitted by the transmit antennas 411 as a transmitted RF chirp 413. The processor 471 may also dictate the length of each chirp and the duty cycle or delay between chirps. For example, the processor 471 may provide time periods of transmission and frequencies of transmission to the transmit signal generator 451, such that the transmit frequency generator 451 generates electrical chirp signals to be transmitted by the transmit antennas 411 during specified time periods. The processor 471 may act as a central control unit of the system 421 to implement or cause to be implemented any of the functionalities or methods described herein. For example, the processor 471 may provide instructions for timing the switch 415, such that uniquely distinguishable RF chirps 413 are transmitted by the transmit antennas 411.

The processor 471 may be coupled to a memory 481 that includes instructions to be executed by the processor 471 to implement the various functionalities and methods described herein. In some embodiments, the processor 471 may be omitted and an FPGA, ASIC, and/or other control circuitry may be utilized.

In some embodiments, the system 421 generates the transmitted RF chirp 413 using a Linear Frequency Modulated Continuous Wave (LFMCW) transmit and demodulation routine to transmit a wide band signal that is linearly swept over a bandwidth from a start frequency to an end frequency. For example, the system 421 may transmit an RF chirp 413 with a bandwidth of approximately 100 MHz with the chirp starting at a frequency of 16.01 GHz and finishing at a frequency of 16.11 GHz. The bandwidth of the chirp and the starting and ending frequencies may be adjusted for a particular application, functional range of the system, signal penetration characteristics, or other performance criteria.

Figure 5A:
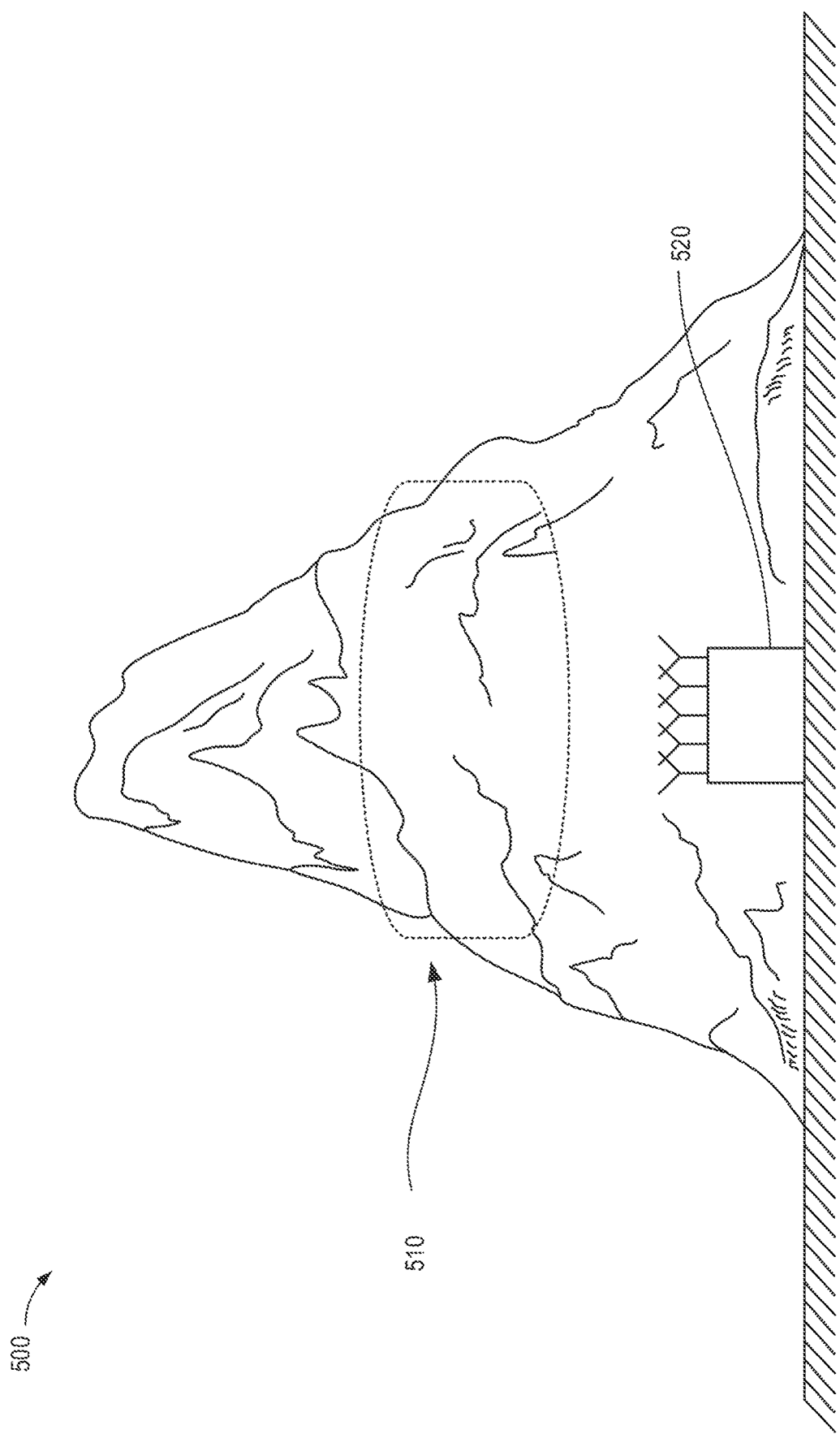
FIG. 5A illustrates a block diagram with a system according to any of the various embodiments described herein to detect motion on a target slope of a mountainside.

FIG. 5A illustrates a block diagram 500 with a system 520, according to any of the various embodiments described herein, to detect motion on a target slope 510 of a mountainside outlined with dashed lines. The system 520 transmits one or more RF chirps via one or more transmit antennas to irradiate at least the target slope 510 outlined with dashed lines.

FIG. 5B illustrates the simplified block diagram 500 with the system 520 receiving six reflected chirps from the indicated locations within the dashed lines outlining the target slope 510.

Figure 5C:
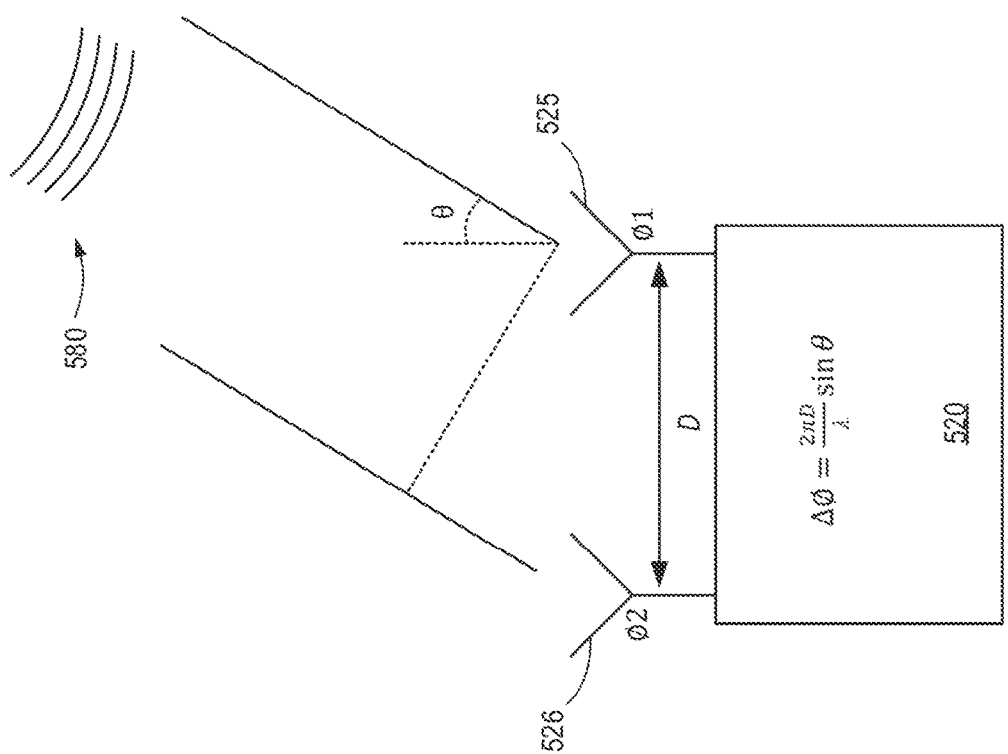
FIG. 5C illustrates an enlarged view of the system with two receive antennas receiving a reflected chirp at an unknown azimuth angle, according to one embodiment.

FIG. 5C illustrates an enlarged view of the system 520 with two receive antennas 525 and 526 separated by a distance, D, receiving a reflected chirp 580 at an unknown azimuth angle, θ. The first receive antenna 525 detects the reflected chirp 580 at a first phase angle, $\emptyset_1$. Subsequently, the second receive antenna 526 detects the reflected chirp 580 at a second phase angle, $\emptyset_2$. As described herein, the system 520 may determine the azimuth angle, θ, from which the reflected chirp originated based on differences in the phase angles at which the two receive antennas 525 and 526 detect the reflected chirp 580 using Equation 1 below.

$$\Delta \emptyset = \frac{2\pi D}{\lambda} \sin\theta \quad Equation\ 1$$

In Equation 1, D is the distance between the first receive antenna 525 and the second receive antenna 526. $\Delta\emptyset$ is the difference between the phase angles, $\emptyset_1$ and $\emptyset_2$, at which the first and second receive antennas 525 and 526 detect the reflected chirp 580. λ is the wavelength of the reflected chirp 580 and θ is the azimuth angle of the reflected chirp 580.

Figure 5E:
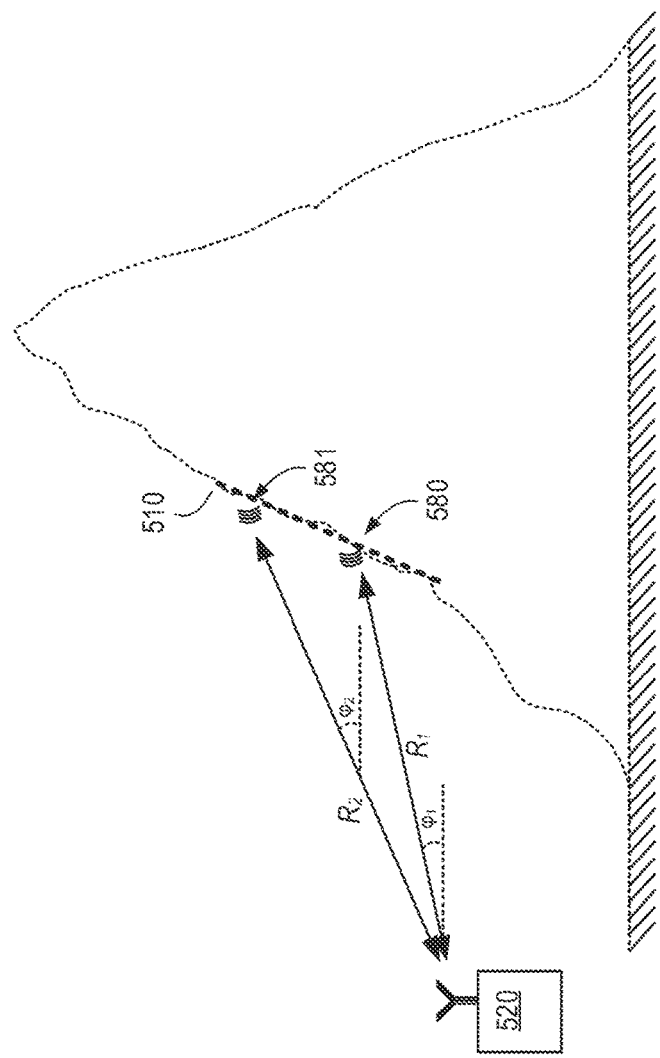
FIG. 5E illustrates a cutaway view of the mountain from the side, according to one embodiment.
Figure 5D:
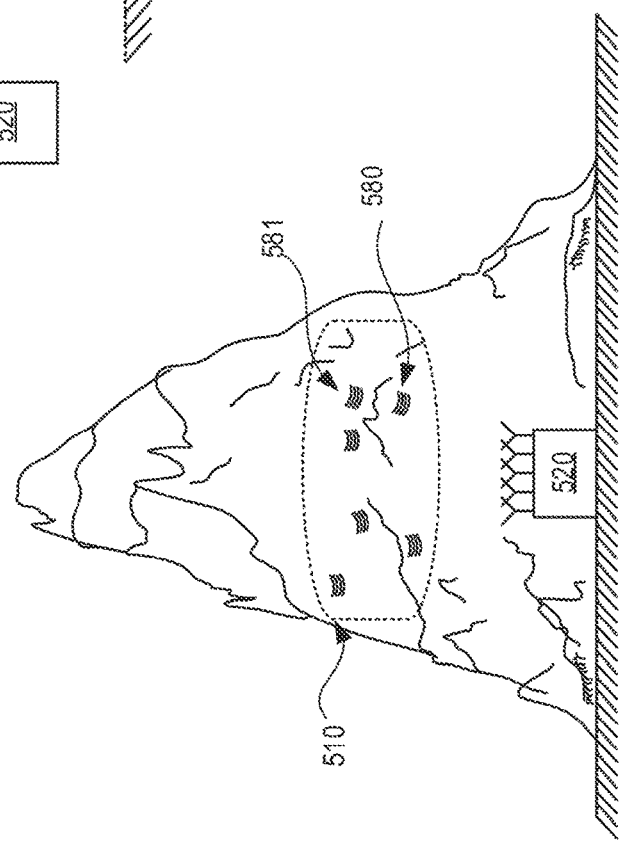
FIG. 5D illustrates the simplified block diagram with reflected chirps specifically identified within the target slope, according to one embodiment.

FIG. 5D illustrates the simplified block diagram of FIG. 5B with reflected chirps 580 and 581 specifically identified within the target slope 510. The system 520 may determine that the reflected chirps 580 and 581 originate from the same azimuth angle relative to the receive antennas because they are close to being vertically aligned.

FIG. 5E illustrates a cutaway view of the mountain from the side to illustrate the locations of the reflected chirps 580 and 581 within the target slope 510. The system 520 receives the reflected chirps 580 and 581 at unknown elevation angles. However, the system 520 can determine a time-of-flight for each of the reflected chirps 580 and 581. Specifically, the round-trip time-of-flight can be calculated as the difference between time at which the RF chirp is transmitted and the arrival time of each respective reflected chirp 580 and 581. The range to the location from which each reflected chirp originates can be calculated using Equation 2 below.

$$t = \frac{2r}{c} \quad Equation\ 2$$

In Equation 2, t corresponds to the time delay between the transmitted RF chirp and the received reflected chirp, c corresponds to the speed of light, and the r is the range. The system 520 may calculate the range, $R_1$, to the location from which the reflected chirp 580 originates and the range, $R_2$, to the location from which the reflected chirp 581 originates.

Traditional imaging systems may utilize mechanically moveable antennas, two-dimensional antenna arrays, and/or other reconfigurable antenna systems to calculate range, azimuth angles, and elevation angles of received signals. However, the presently described systems and methods leverage topographical knowledge of the target slope to allow for complete localization of signals using a one-dimensional array of receive antennas. The system 520 includes a data store or has access to a data store that correlates or allows for the correlation of azimuth angles, ranges, and elevation angles between the system 520 and locations on the target slope 510.

As previously noted, for slopes greater than 0 and less than 90 degrees, there is a one-to-one correlation between ranges and elevation angles for a given azimuth angle. In some embodiments, the system 520 may have topographical information of the target slope 510 in the form of a lookup table that specifies elevation angles for various combinations of azimuth angles and ranges from the system 520 to locations on the target slope. In some embodiments, the lookup table may not include every possible azimuth angle and range combination. In such instances, the system 520 may interpolate an elevation angle for a specific azimuth angle and range combination using combinations of azimuth angles and ranges that are included in the lookup table. In one embodiment, the system 520 may have topographical information of the target slope 510 in the form of a topographical map of the target slope 510 to estimate elevation angles of reflected chirps based on calculated azimuth angles and ranges. For example, the system may utilize known latitude, longitude, and altitude values of locations on the mountainside to compute azimuth, elevation, and distance relative to the system. The values can be used to create a lookup table that can later be referenced to determine elevation values given azimuth and distance calculations.

In situations in which topographical information of a target slope is not known or available to the system 520, the system 520 may generate return value representations as two-dimensional projections of the target slope defined in terms of azimuth and range. Avalanches, landslides, and other motion events may still be detected even though the representations may be spatially distorted.

FIG. 6 illustrates an example of a full array 600 of uniformly distributed microstrip antennas 610 in a sliding rack that includes a top rack 605 and a bottom rack 615. In other embodiments, the microstrip antennas 610 may be permanently secured relative to one another and/or secured via an alternative mounting apparatus. Each of the illustrated microstrip antennas 610 includes a dual micro-strip, center-feed patch antenna. The illustrated full array 600 of receiver antennas 610 may be used in any of the various embodiments described herein.

FIG. 7 illustrates an example of a sparse or thinned array 750 of microstrip antennas 760 mounted in a sliding rack that includes a top rack 755 and a bottom rack 765. Each of the microstrip antennas 760 between the top and bottom racks 755 and 765 may include a dual micro-strip, center-feed patch antenna. The sparse or thinned array 750 of microstrip antennas may be mounted between the top and bottom racks 755 and 765 in arbitrary or patterned spacing configurations. The receive antennas of any of the various systems described herein may be embodied as a sparse or thinned array 750 of microstrip antennas 760. The reduced number of microstrip antennas 760 in the sparse or thinned array 750 may reduce the cost and/or complexity of the system as compared to embodiments using the full array 600 of microstrip antennas 610 in FIG. 6.

Figure 8A:
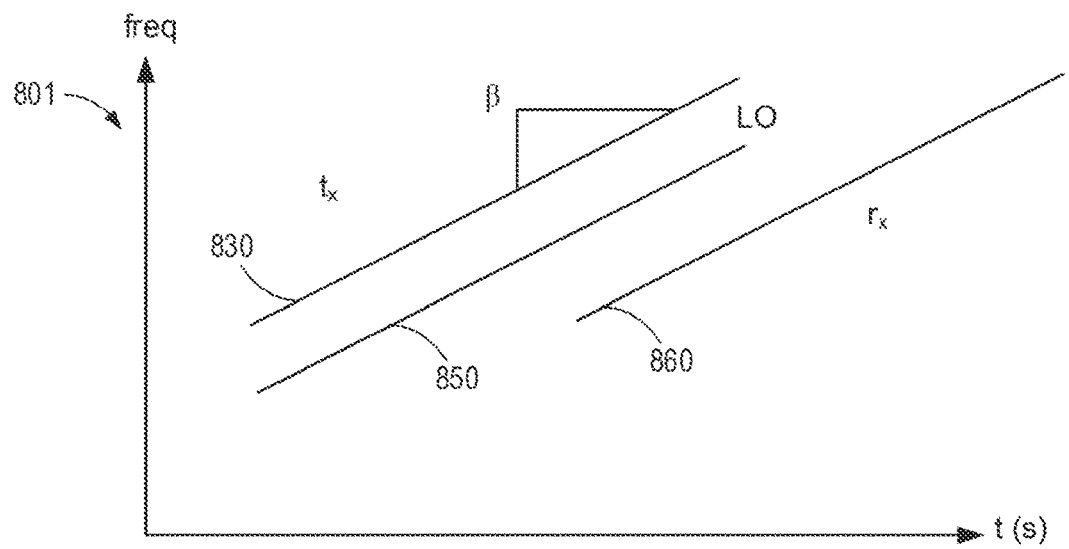
FIG. 8A illustrates a timing diagram of transmitted and received reflected chirps and an offset local-oscillator signal, according to one embodiment.

FIG. 8A illustrates a graph 801 of frequency with respect to time and shows a transmitted RF chirp 830 that increases at a rate of $\beta$ Hz per time unit. As described herein, a processor or detection subsystem utilizes the frequency of the transmitted RF chirp 830 to determine the azimuth angle using Equation 1. The length of the transmitted RF chirp 830 (i.e., the time elapsed from the beginning of the transmitted RF chirp 830 to the end of the transmitted RF chirp 830) may be used to determine a range to a location from which the reflected chirp 860 originates. In some embodiments, time delay between the beginning (or end) of the transmitted RF chirp 830 and the beginning (or end) of the reflected chirp 860 may be used to determine the range to the origin of the reflected chirp 860 using Equation 2.

In various embodiments, the reflected chirp received by the receiver antennas may be mixed with an offset local-oscillator ("LO") signal 850. The offset LO signal 850 may correspond to the electrical chirp used to transmit the transmitted RF chirp 830 offset by a fixed frequency, such as 10 MHz. The offset LO signal 850 may be selected based on the capabilities of an ADC.

Figure 8B:
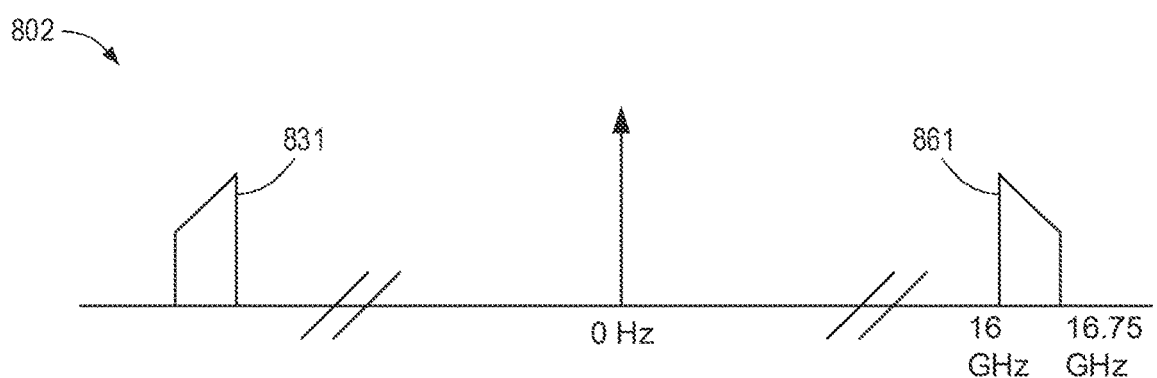
FIG. 8B illustrates a diagram of amplitude relative to frequency for transmitted and received reflected chirps, according to one embodiment.

FIG. 8B illustrates a graph 802 that includes signals 831 and 861 with frequency bandwidths of approximately 100 MHz. Signal 861, for example, starts at approximately 16.01 GHz and ends at approximately 16.11 GHz. Reflected chirp 861 represents a reflection from a sloped portion of a target region of a mountain or other surface. The range (e.g., the distance) from the receiver antennas to a location on the target region from which the reflected chirp 861 originates may be referred to as a "slant range" on a mountain slope. The reflected chirp 861 from the target slope may include a span of slant ranges based on varying points from which the transmitted RF chirp was reflected. Such slant ranges may correspond, in accordance with Equation 2, to a range of frequencies.

Figure 8C:
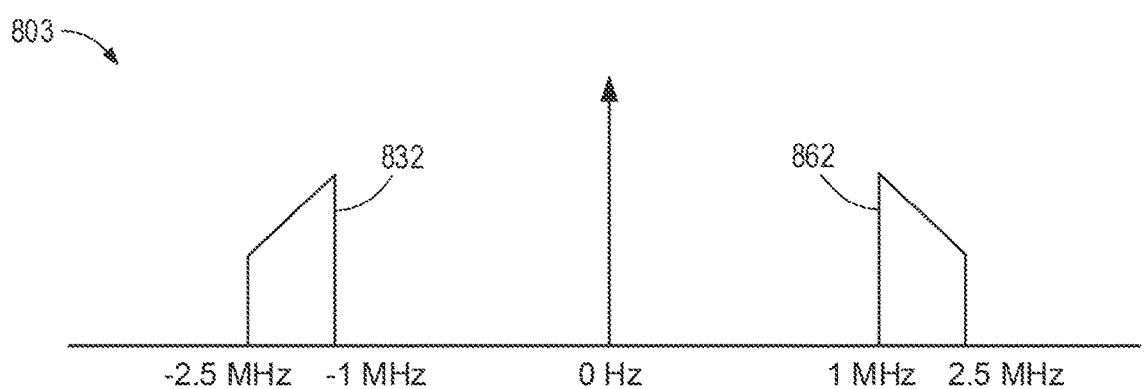
FIG. 8C illustrates an example of a slant range of frequencies after the offset local-oscillator signal is mixed with the reflected chirp received by the receiver antennas

FIG. 8C illustrates a graph 803 of slant ranges 832 and 862 of frequencies from 1 MHz to 2.5 MHz in the frequency domain after the offset LO signal (850, FIG. 8A) is mixed with the transmitted and reflected chirps (831 and 861, FIG. 8B) received by the receiver antennas.

Figure 8D:
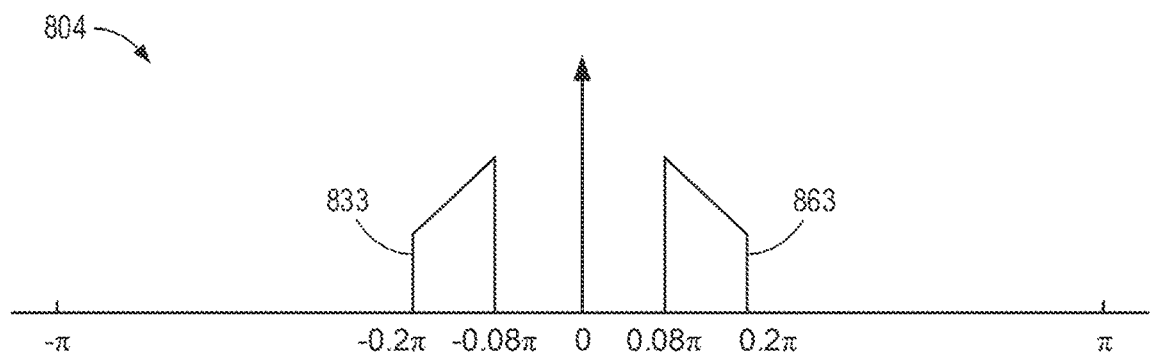
FIG. 8D illustrates a graph of digital samplings of the slant ranges in FIG. 8C, according to one embodiment.

FIG. 8D illustrates a graph 804 of digital samplings 833 and 863 of the slant ranges 832 and 862 in FIG. 8C. For example, an ADC may digitally sample the slant ranges 832 and 862. For example, if the ADC samples at 25 million samples per second ("MSPS"), a 1 to 2.5 MHz signal is translated to $0.08\pi$ to $0.2\pi$ on a digital frequency scale, as illustrated.

Figure 8E:
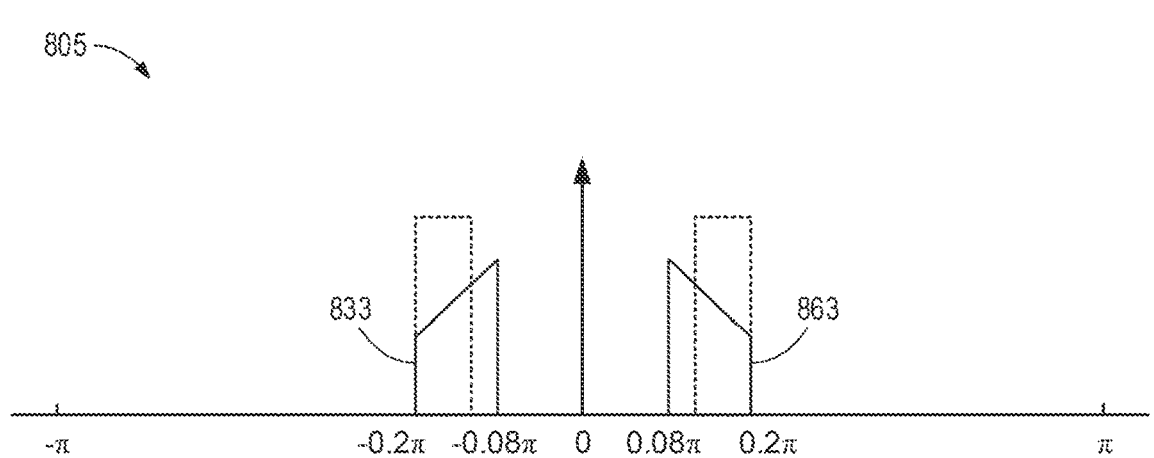
FIG. 8E illustrates the application of a bandpass filter (dashed lines) applied to the digital samplings 833 and 863, according to one embodiment.

FIG. 8E illustrates a graph 805 of the application of a bandpass filter (dashed lines) applied to the digital samplings 833 and 863. In various embodiments, the system may apply the bandpass filter through digital signal processing techniques to eliminate the lower frequencies. Lower frequencies of the reflected chirps correspond to signals received from the near range of the system that are outside of the target slope. Signals reflected and received from the near range may have disproportionality high power levels and contribute noise to the signals received from the target slope. The bandpass filter may be selected to specify slant ranges per Equation 2, that correspond to reflected chirps originating from the target slope. The bandpass filter may be selected with real coefficients to filter both sides of the frequency spectrum and eliminate power return from objects at very close range. A processor, control circuitry, or other controller may implement the bandpass filter.

Figure 8F:
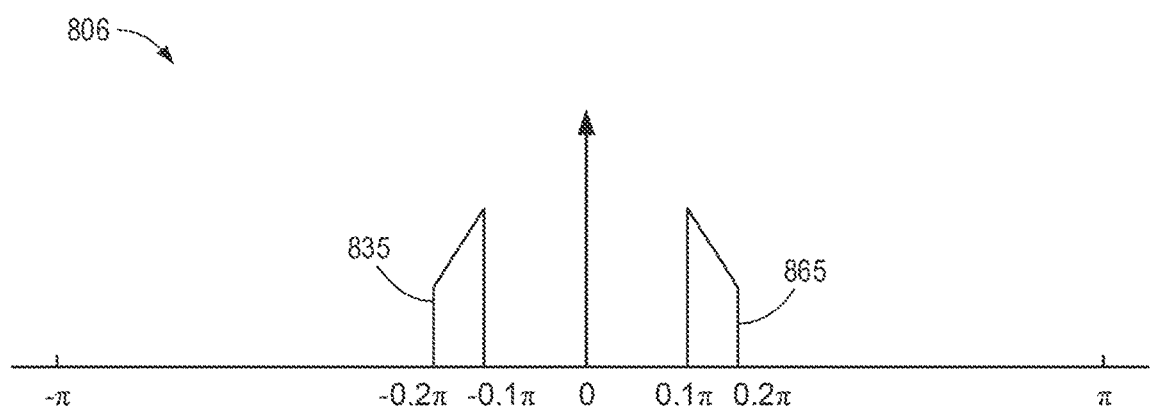
FIG. 8F illustrates a graph of the transmitted RF chirps and reflected chirps after being mixed with the offset LO signal, digitally sampled and bandpass filtered, according to various embodiments.

FIG. 8F illustrates a graph 806 of the samples 831 and 861 after being mixed with the offset LO signal, digitally sampled, and bandpass filtered to become samples 835 and 865, according to one embodiment. The remaining bandpassed samples 835 and 865 exist from $0.1\pi$ to $0.2\pi$.

Figure 8G:
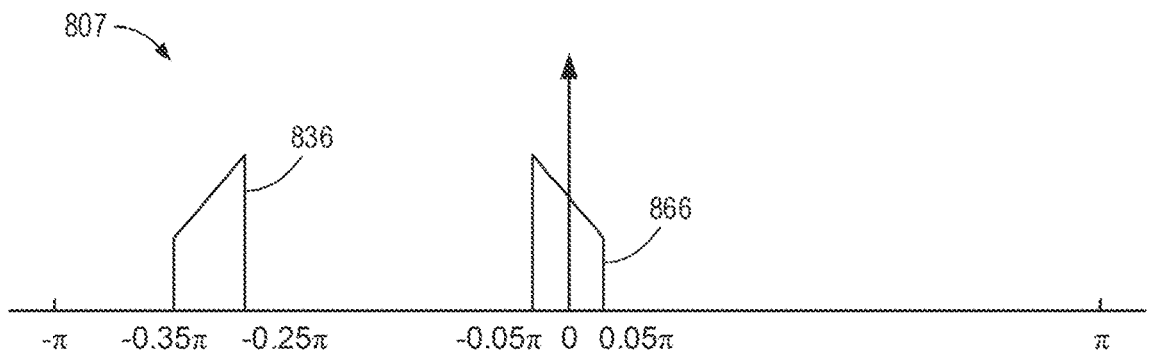
FIG. 8G illustrates the RF chirp of FIG. 8F digitally downconverted to a baseband range, according to one embodiment.

FIG. 8G illustrates a graph 807 of the samples 835 and 865 digitally downconverted to a baseband range to become samples 836 and 866. The system may implement the digital down-conversion by applying an in-phase/quadrature (I/Q) mixing routine to the samples 835 and 865. For example, samples 835 and 865 may be multiplied by a complex representation of a target baseband frequency.

Figure 8H:
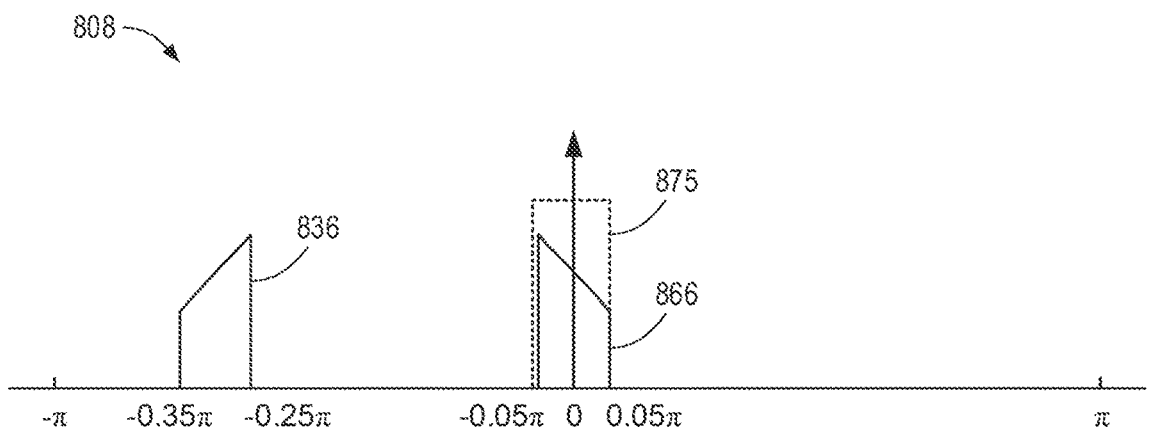
FIG. 8H illustrates a graph of a lowpass filter applied to the signals such that only the signal originating from the reflected chirp, according to one embodiment.

FIG. 8H illustrates a graph 808 of a lowpass filter 875 applied to the samples 836 and 866 such that only the samples 866 originating from the reflected chirp will remain, according to one embodiment.

Figure 8I:
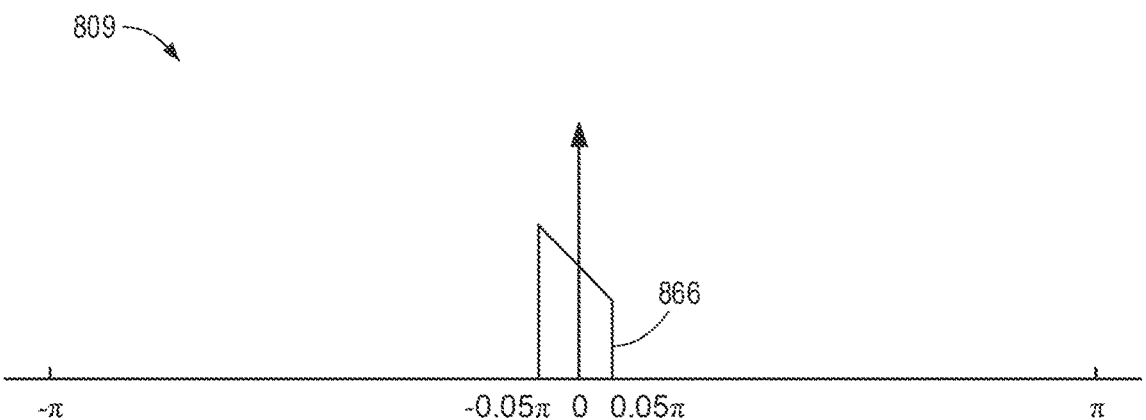
FIG. 8I illustrates a graph of the remaining samples after the application of the lowpass filter, according to one embodiment.

FIG. 8I illustrates a graph 809 of the remaining samples 866 after the application of the lowpass filter, according to one embodiment. As depicted in FIGS. 8H and 8I, the mixing and filtering shifts the frequency representation of the samples 866 to be centered in baseband, thereby removing the duplicative samples 836 (i.e., those between $-0.35\pi$ and $-0.25\pi$ in FIG. 8H). Moreover, because the samples 836 in FIG. 8H are a complex representation of the signal, all range and azimuth information from the reflected chirp is represented in the remaining samples 866 in FIG. 8I.

Figure 8J:
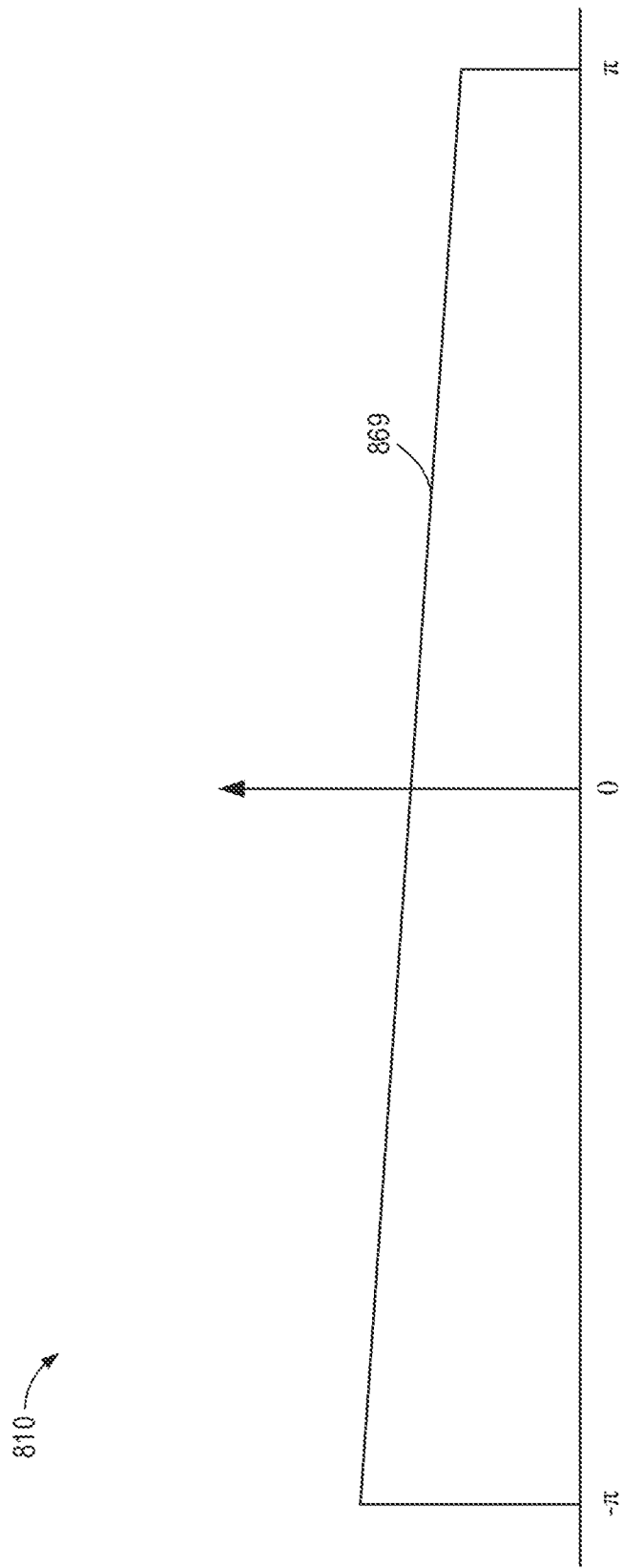
FIG. 8J illustrates the RF chirp of FIG. 9I decimated by twenty, according to one specific embodiment.

FIG. 8J illustrates a graph 810 of the samples 866 from FIG. 8I after being decimated as samples 869 between $-\pi$ and $\pi$. Decimation reduces the sample rate (e.g., the sample rate of the ADC). In the illustrated example, the samples 866 in FIG. 8I are decimated by twenty, meaning that every twentieth sample is retained while the other samples are discarded. The decimation factor may be adjusted in different applications and selected to prevent anti-aliasing. As can be appreciated, various decimation factors may be selected based on the ADC sample rate, desired signal bandwidth, and resulting data rate, among other factors.

FIGS. 8A-8J illustrate the simplified processing of a single signal. In many embodiments, the systems and methods described herein may operate with multiple receive channels (e.g., 2, 4, 8, 32, etc.) in parallel. The processed signals may be further processed to determine return values of reflected chirps in conjunction with calculated azimuth and range information. Elevation information may be determined and return value representations may be analyzed to determine if an avalanche has occurred.

Figure 9:
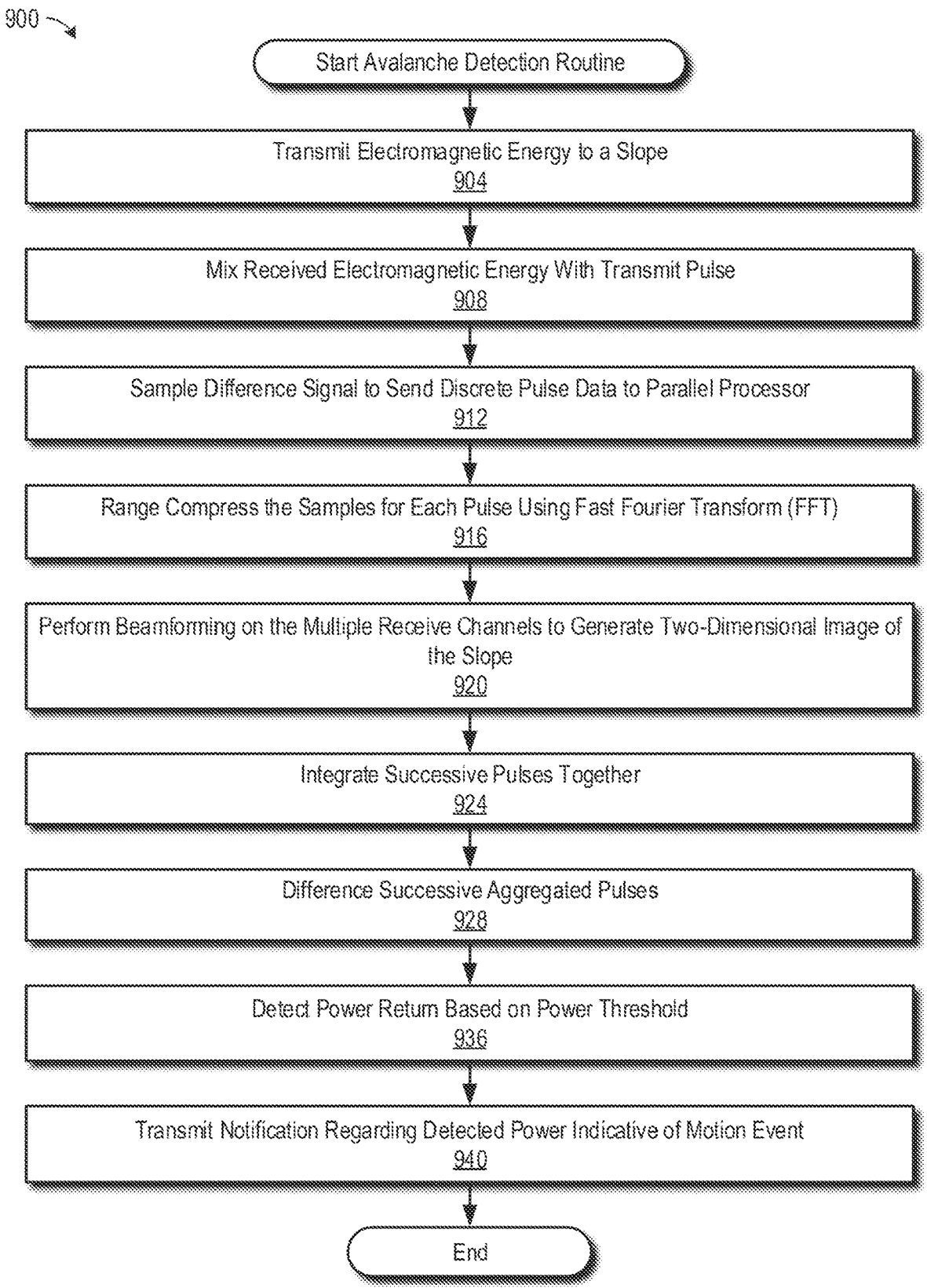
FIG. 9 illustrates a flowchart of a method to detect motion indicative of an avalanche, according to various embodiments.

FIG. 9 illustrates a flowchart of a method 900 to detect changes or variations in return values of reflected chirps indicative of motion events, such as avalanches, on sloped surfaces. The systems described in conjunction with FIGS. 4A and 4B may implement the various operations, functions, and methods described herein. Various modules or subsystems may be specifically tailored to implement one or more of the operations, functions or methods via hardware, firmware, software, and/or combinations thereof. Some operations may be stored in memory as instructions or code to be executed by a processor.

The motion detection routines described herein may utilize RF chirps and a corresponding offset LO signal, and process reflected chirps from a target area of a mountain slope to generate azimuth, range, and/or elevation information for the detection of motion events, such as avalanches, landslides, or the like. As discussed herein, the detection system may include an antenna array with a fixed alignment along the azimuth axis, the axis parallel to the plane of the antenna array alignment.

The system may transmit, at 904, electromagnetic energy to a sloped surface, such as a mountain slope. The mountain slope may, for example, be snow covered and susceptible to an avalanche. In other instances, the mountain slope may include rocks, mud, ice, water or other objects that may susceptible to sliding (e.g., a landslide). The electromagnetic energy may be a RF chirp transmitted by one or more transmit antennas. The mountain slope may reflect some of the transmitted RF chirps as reflected chirps.

The system may mix, at 908, the received electromagnetic energy with a transmit pulse and an offset LO signal to obtain a downconverted difference signal. The system may sample, at 912, the downconverted difference signal to generate discrete pulse data for processing via a processor, ASIC, FPGA, or the like. For example, the system may sample, at 912, the downconverted difference signal via an ADC, to convert the analog, downconverted difference signal into digitized sampled values (samples).

The system may range compress, at 916, the samples for each pulse using a Fast Fourier Transform ("FFT") or other processing routine to generate range and azimuth information. The system implements an effective digital beamforming, at 920, to generate representations of the physical target in a range domain or an azimuth domain. For example, in a uniformly spaced array of antennas, an FFT along the azimuth axis forms multiple azimuth signals in equally spaced angles in relation to the boresight of the antennas. As another example, in a sparse, non-uniformly spaced array of antennas, multiple azimuth signals are formed by multiplying the phase information of each pulse data with a constant that can be calculated using an azimuth angle.

The system may implement digital beamforming, at 920, on the multiple receive channels to generate a two-dimensional image of the slope. For example, when the azimuth signals are multiplied and summed together, the angle of arrival of the target may be calculated. In some implementations, a three-dimensional image may also be generated by converting the channel axis to the azimuth axis. Accordingly, a three-dimensional image may include axes for azimuth, range, and time. A sequence of two-dimensional projections of the mountain slope can be stepped through in time to visualize motion on the slope over time.

In some embodiments, the signal-to-noise-ratio ("SNR") may be improved by integrating, at 924, successive pulses together. For example, integrating successive pulses may be accomplished, coherently, in averaging phase coherent pulses together after digital beamforming. As another example, integrating successive pulses may be accomplished, incoherently, in identifying the magnitude of the pulses to be utilized in the averaging of the pulses. However, incoherent integration may eliminate the phase information from the successive pulses. After averaging the successive pulses, the successive pulses may be referred to as aggregated successive pulses.

The system may determine differences, at 928, of the aggregated successive pulses, for example, to isolate movement in the target area. The reflected chirps or received electromagnetic energy may include returns from objects outside the target area (e.g., a range near the device) or from stationary objects, including higher power returns from nearby objects. To remove that higher power return, the consecutive pulses can be differenced from each other to zero-out the power return from the stationary objects and/or from the near-range objects. As another example, the processor may utilize a high pass filter to remove the portion of the frequency domain that does not exhibit return value variations over time. A high pass filter may also eliminate higher power returns from stationary objects to highlight moving objects, such as an avalanche or other moving objects.

The system may detect, at 936, spatial power returns that exceed a minimum power detection threshold. The system may generate a sequence of image representations of changes to power returns (or phase shifts) on the slope. Stepping through the sequence of image representations allows for motion on the slope to be visualized. The system may detect patterns of power returns or phase shifts indicative of specific, identifiable motion events, such as landslides or avalanches. The system may transmit, at 940, notifications of detected motion events. FIGS. 10-13 illustrate example return value representations of spatially defined return values from reflected chirps from a target slope.

Figure 10:
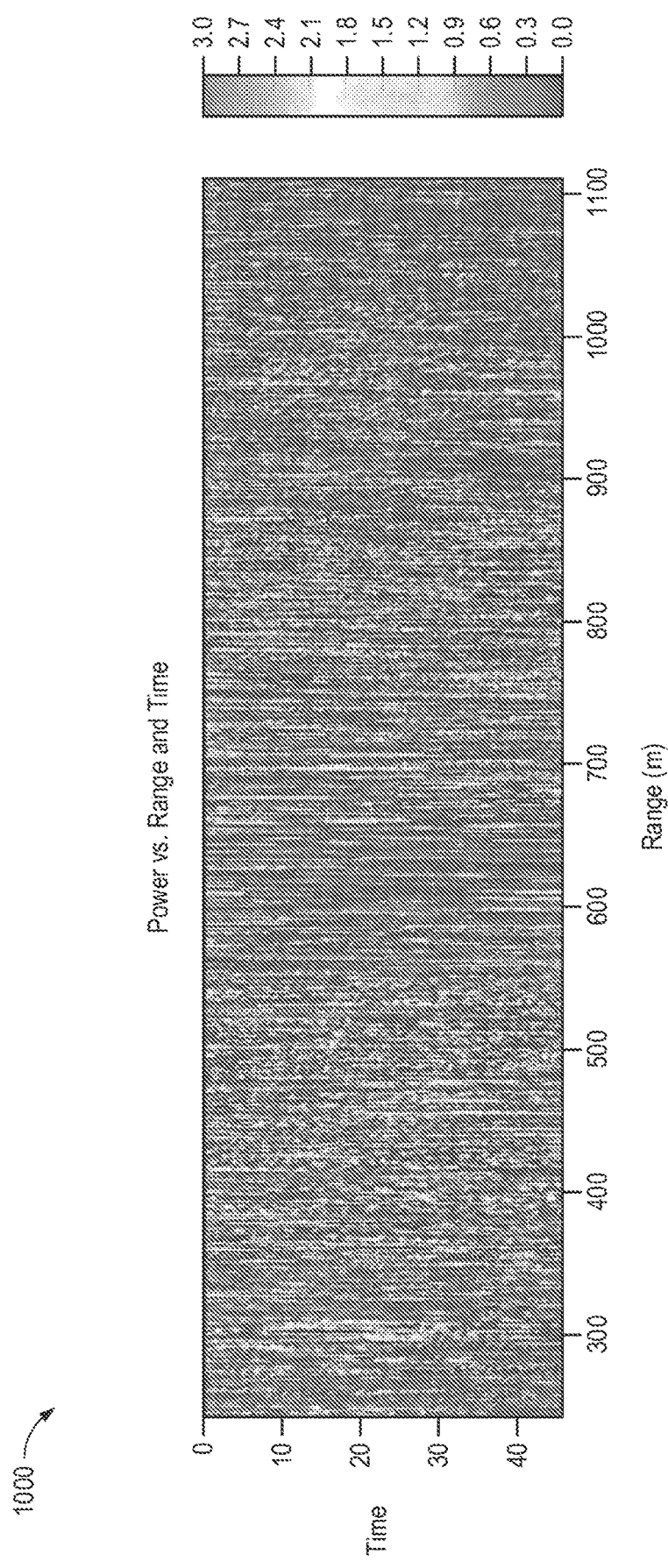
FIG. 10 illustrates an example of a two-dimensional image of power vs range and time, as generated by a processor of an example motion detection system.

FIG. 10 illustrates an example of a two-dimensional image 1000 of power vs range and time, as generated by a processor of an example motion detection system, prior to high pass filtering and differencing of successive pulses or frames. The relatively high return of stationary objects and near-range objects makes it difficult to see actual motion. The system may apply a high-pass filter and difference successive pulses or frames to reveal motion that is currently obscured.

Figure 11:
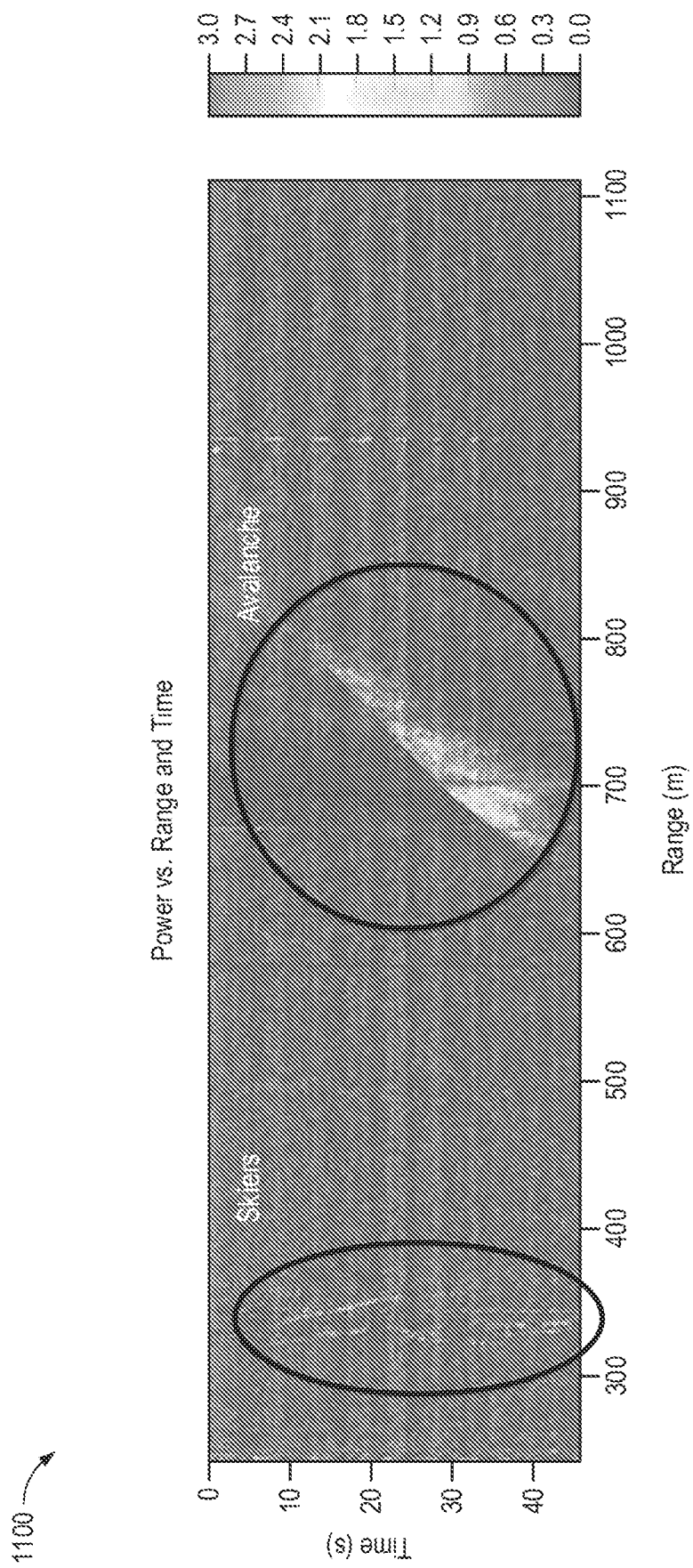
FIG. 11 illustrates another example of a two-dimensional image of power vs range and time, as generated by a processor of an example motion detection system.

FIG. 11 illustrates another example of a two-dimensional image 1100 of power vs range and time, as generated by a processor of an example motion detection system after filtering and differencing of successive pulses. Motion from skiers can be identified at a range of approximately 350 meters and an avalanche can be seen progressing from a range of approximately 800 meters to a range of 650 meters during the 40 seconds illustrated in the two-dimensional image 1100. The system may provide a notification or alert that an avalanche has occurred or is occurring. The image 1100 makes it easy to quickly visualize the status of the avalanche and that the skiers are safe and out of range.

This disclosure has been made with reference to various examples and embodiments, including the best mode. However, those skilled in the art will recognize that changes and modifications may be made to the exemplary embodiments without departing from the scope of the present disclosure.

While the principles of this disclosure have been shown in various embodiments, many modifications of structure, arrangements, proportions, elements, materials, and components may be adapted for a specific environment, application, and/or operation parameters without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should be determined to encompass at least the following claims.

What is claimed is:

1. A system, comprising:
   receive antennas to receive reflections of transmitted radio frequency (RF) chirps as reflected chirps from locations definable in terms of azimuth and elevation on a two-dimensional projection of a target slope; and
   a detection subsystem to:
      determine an azimuth of each reflected chirp;
      determine an elevation of each reflected chirp based on slant ranges of reflected chirps in the frequency domain and topographical slope information of the target slope, including known slopes of the target slope at the determined azimuth of each reflected chirp;
      determine a return value of each reflected chirp;
      generate sequential return value representations of the target slope based on reflected chirps from multiple locations on the target slope;
      detect a motion event on the target slope based on variations in at least one of the return value representations; and
      report the detected motion event.

2. The system of claim 1, wherein the detection subsystem determines the azimuth of each reflected chirp based on relative positions of the receive antennas and at least one of (i) differences in timing at which different receive antennas detect the reflected chirp and (ii) differences in phase angles at which different receive antennas receive the reflected chirp.

3. The system of claim 1, wherein the detection subsystem comprises a digital beamforming subsystem to determine the azimuth of reflected chirps.

4. The system of claim 1, wherein the detection subsystem is configured to determine the elevation of each reflected chirp based on at least (i) a time-of-flight of each reflected chirp, (ii) the determined azimuth of each reflected chirp, and (iii) stored topographical information of the target slope.

5. The system of claim 1, further comprising a signal generator to generate the RF chirps.

6. The system of claim 1, wherein the representations of the target slope are generated as imaging representations in at least one of a range domain and an azimuth domain.

7. The system of claim 1, wherein the plurality of receive antennas comprises a plurality of microstrip antennas.

8. The system of claim 1, wherein the return value comprises a power level.

9. The system of claim 8, wherein the variations in the at least one return value representation indicative of the motion event comprise power levels of a plurality of reflected chirps exceeding a baseline power level by a threshold amount.

10. The system of claim 1, wherein the return value comprises a phase shift value.

11. The system of claim 10, wherein the variations in the at least one return value representation indicative of the motion event comprise phase shift deviations of a plurality of reflected chirps that exceed threshold values.

12. The system of claim 1, wherein the detection subsystem comprises at least one of:
   a field-programmable gate array (FPGA);
   an application specific integrated circuit (ASIC); and
   a processor and a non-transitory computer-readable medium with instructions stored therein that, when executed by the processor, cause the processor to determine the elevation and azimuth information.

13. The system of claim 5, wherein the signal generator comprises a radio frequency mixer to mix an oscillating frequency signal and a transmission signal to generate the RF chirps.

14. The system of claim 1, wherein the detection subsystem is further configured to distinguish between detected motion events caused by an avalanche or a landslide, detected motion events caused by lifeform movement, and detected motion events caused by changes in environmental conditions.

15. A method, comprising:
   receiving, via receive antennas, reflections of a sequence of radio frequency (RF) chirps as reflected chirps from locations defined in terms of azimuth and elevation on a target mountainside;
   determining an azimuth of each reflected chirp;
   determining a range to the locations at which the reflected chirps are received;
   determining an elevation of each reflected chirp based at least in part on slant ranges of reflected chirps, a slope of the target mountainside at the determined azimuth, and the determined range;
   determining a return value of each reflected chirp;
   generating sequential return value representations of the target mountainside based on reflected chirps from multiple locations on the target mountainside;
   detecting a motion event on the target mountainside based on variations in at least one of the return value representations; and
   communicating the detected motion event.

16. An avalanche detection system, comprising:
   an array of receive antennas at a fixed orientation relative to a target region to receive reflections of transmitted radio frequency (RF) chirps as reflected chirps from locations defined in terms of azimuth and elevation on the target region;
   a digital beamforming subsystem to determine an azimuth of each reflected chirp;
   an elevation determination subsystem to determine an elevation of each reflected chirp based at least in part on slant ranges of reflected chirps and a slope of the target region at the determined azimuth;
   a return value subsystem to
      determine a return value associated with each reflected chirp, and
      generate sequential return value representations of the target region based on reflected chirps from multiple locations on the target region;
   a motion detection subsystem to detect a motion event corresponding to an avalanche on the target region based on analysis of at least some of the sequential return value representations; and a communication subsystem to report the detected motion event corresponding to an avalanche.

17. The method of claim 15, wherein determining the azimuth of each reflected chirp comprises an evaluation of relative positions of the receive antennas and at least one of (i) differences in timing at which different receive antennas detect the reflected chirp and (ii) differences in phase angles at which different receive antennas receive the reflected chirp.

18. The method of claim 15, wherein determining the azimuth of each reflected chirp comprises using a digital beamforming subsystem.

* * * * *